(12) United States Patent
Yu et al.

(10) Patent No.: US 12,469,972 B2
(45) Date of Patent: Nov. 11, 2025

(54) ELECTRONIC DEVICE COMPRISING ANTENNA

(71) Applicant: Samsung Electronics Co., Ltd., Suwon-si (KR)

(72) Inventors: Changha Yu, Suwon-si (KR); Woosuk Kang, Suwon-si (KR); Yunsik Kim, Suwon-si (KR); Mincheol Seo, Suwon-si (KR); Donghun Shin, Suwon-si (KR); Minkyung Lee, Suwon-si (KR); Gyubok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 18/189,752

(22) Filed: Mar. 24, 2023

(65) Prior Publication Data

US 2023/0307829 A1 Sep. 28, 2023

Related U.S. Application Data

(63) Continuation of application No. PCT/KR2023/002966, filed on Mar. 3, 2023.

(30) Foreign Application Priority Data

Mar. 23, 2022 (KR) .................. 10-2022-0036217
Apr. 21, 2022 (KR) .................. 10-2022-0049767

(51) Int. Cl.
  *H01Q 5/378* (2015.01)
  *H01Q 1/24* (2006.01)
  *H01Q 5/40* (2015.01)

(52) U.S. Cl.
  CPC ............. *H01Q 5/378* (2015.01); *H01Q 1/244* (2013.01); *H01Q 5/40* (2015.01)

(58) Field of Classification Search
  CPC .......... H01Q 5/378; H01Q 1/244; H01Q 5/40; H01Q 5/35; H01Q 1/243
  See application file for complete search history.

(56) References Cited

U.S. PATENT DOCUMENTS 11,184,987 B1 11/2021 Jung et al.
11,217,892 B2 1/2022 Lee et al.
(Continued)

FOREIGN PATENT DOCUMENTS

KR 10-2017-0066944 A 6/2017
KR 10-2019-0086160 A 7/2019
(Continued)

OTHER PUBLICATIONS

Lateral Definition & Meaning, Retrieved dictionary.com website on Mar. 18, 2025, https://www.dictionary.com/browse/lateral (Year: 2025).*

(Continued)

*Primary Examiner* — Dameon E Levi
*Assistant Examiner* — Anh N Ho
(74) *Attorney, Agent, or Firm* — Jefferson IP Law, LLP

(57) ABSTRACT

An electronic device is provided. The electronic device includes a first housing comprising a first space and comprising a conductive portion, a second housing comprising a second space and slidably coupled to the first housing, a flexible display disposed to be supported by the first housing and the second housing and having a display area expanding when being transitioned from a slide-in state to a slide-out state, and a wireless communication circuit disposed in the first space and configured to transmit or receive a wireless signal in a designated frequency band via the conductive portion, wherein the electronic device comprises a conductive stub disposed in the second housing and disposed to be (Continued)

connectable through capacitive coupling to at least a part of the conductive portion in the slide-in state.

20 Claims, 18 Drawing Sheets

(56) References Cited

U.S. PATENT DOCUMENTS

| | | | |
|---|---|---|---|
| 11,228,093 B2 | 1/2022 | Won et al. | |
| 11,470,729 B2 | 10/2022 | Kim et al. | |
| 11,895,788 B2 | 2/2024 | Jung et al. | |
| 2010/0227657 A1* | 9/2010 | Mashima | H01Q 9/0442 |
| | | | 455/575.4 |
| 2016/0118710 A1 | 4/2016 | Shin et al. | |
| 2017/0142241 A1* | 5/2017 | Kim | H01Q 9/30 |
| 2018/0366813 A1 | 12/2018 | Kim et al. | |
| 2020/0350939 A1 | 11/2020 | Lee et al. | |
| 2021/0359392 A1* | 11/2021 | Won | H04M 1/0237 |
| 2022/0019261 A1 | 1/2022 | Kang et al. | |
| 2022/0115772 A1* | 4/2022 | Kim | H01Q 21/28 |
| 2022/0140469 A1* | 5/2022 | An | H01Q 1/243 |
| | | | 455/73 |
| 2023/0291101 A1* | 9/2023 | Lee | H01Q 5/357 |

FOREIGN PATENT DOCUMENTS

| | | |
|---|---|---|
| KR | 10-2020-0121518 A | 10/2020 |
| KR | 10-2242262 B1 | 4/2021 |
| KR | 10-2021-0055660 A | 5/2021 |
| KR | 10-2021-0125346 A | 10/2021 |
| KR | 10-2022-0021400 A | 2/2022 |
| KR | 10-2022-0027600 A | 3/2022 |
| WO | WO-2011125569 A1 * 10/2011 ............ H01Q 1/243 |
| WO | 2022/045771 A1 | 3/2022 |

OTHER PUBLICATIONS

International Search Report and Written Opinion dated Jun. 5, 2023, issued in International Patent Application No. PCT /KR2023/ 002966.
Extended European Search Report dated May 12, 2025; European Appln. No. 23775194.6-1201 / 4465443 PCT/KR2023002966.

* cited by examiner

ELECTRONIC DEVICE COMPRISING ANTENNA

CROSS-REFERENCE TO RELATED APPLICATION(S)

This application is a continuation application, claiming priority under § 365(c), of an International application No. PCT/KR2023/002966, filed on Mar. 3, 2023, which is based on and claims the benefit of a Korean patent application number 10-2022-0036217, filed on Mar. 23, 2022, in the Korean Intellectual Property Office, and of a Korean patent application number 10-2022-0049767, filed on Apr. 21, 2022, in the Korean Intellectual Property Office, the disclosure of each of which is incorporated by reference herein in its entirety.

TECHNICAL FIELD

The disclosure relates to an electronic device including an antenna.

BACKGROUND ART

Electronic devices are gradually becoming slimmer, and more rigid, and at the same time design aspects are being strengthened, and functional elements thereof are being developed to be differentiated. The electronic devices are being transformed gradually from a uniform rectangular shape into a variety of shapes. An electronic device may have a transformable structure capable of using a large-screen display while being convenient to carry. The electronic device may have a structure (e.g., a rollable structure or a slidable structure) capable of changing the display area of a flexible display via support of housings which operate in a sliding manner with respect to each other. Such the electronic device may include at least one antenna using at least one conductive portion used as at least a part of the exterior. In a case where the at least one antenna is applied to the electronic device, a design structure considering radiation performance reduction according to a sliding operation may be required.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may include a rollable electronic device (e.g., a slidable electronic device) in which the display area of a flexible display may be expanded and/or reduced. The rollable electronic device may include a first housing (e.g., a first housing structure, a movable structure, a slide housing, a slide bracket, or a slide structure) and/or a second housing (e.g., a second housing structure, a fixed structure, a base housing, a base bracket, or a base structure) which are movably coupled to each other such that the first and second housings are at least partially fitted together. For example, the first housing and the second housing operate to be slidable with respect to each other and support at least a part of a flexible display (e.g., an expandable display or an extendable display), and may thus induce the flexible display to have a first display area in a slide-in state and to have a second display area larger than the first display area in a slide-out state.

A rollable electronic device may include a housing including a side surface member at least partially configured of a conductive material (e.g., a metal material or a conductive portion) for rigidity reinforcement and beautiful outer appearance. An electronic device may include at least one antenna configured to operate in at least one frequency band via a conductive member disposed to be segmented by at least one segmentation portion arranged on the side surface member.

However, in a slide-in state, a rollable electronic device may be changed to a state in which a first housing or a second housing is at least partially slid into the internal space of the remaining housings, at least a part of a conductive portion used as an antenna may overlap a conductive portion of the remaining housings, and thus radiation performance may be reduced.

Aspects of the disclosure are to address at least the above-mentioned problems and/or disadvantages and to provide at least the advantages described below. Accordingly, an aspect of the disclosure, in slide-in/slide-out states, is to provide an electronic device including an antenna configured to reduce a radiation performance deviation of the antenna. The problem to be solved in the disclosure is not limited to the above-mentioned problem, and may be expanded in various ways without departing from the spirit and scope of the disclosure.

Additional aspects will be set forth in part in the description which follows, and in part, will be apparent from the description, or may be learned by practice of the presented embodiments.

Technical Solution

In accordance with an aspect of the disclosure, an electronic device is provided. The electronic device includes a first housing including a first space and including a conductive portion, a second housing including a second space and slidably coupled to the first housing, a flexible display disposed to be supported by the first housing and the second housing and having a display area expanded when being transitioned from a slide-in state to a slide-out state, and a wireless communication circuit disposed in the first space and configured to transmit or receive a wireless signal in a designated frequency band via the conductive portion, wherein the electronic device includes a conductive stub disposed in the second housing, and in the slide-in state, disposed to be connectable through capacitive coupling to at least a part of the conductive portion.

In accordance with another aspect of the disclosure, an electronic device is provided. The electronic device includes a first housing including a first space and including a first lateral member having a conductive portion, a second housing slidably coupled to the first housing along a first direction, including a second space configured to receive at least a part of the first housing, and at least partially configured of a conductive member, a flexible display disposed to be supported by the first housing and the second housing and having a variable display area when being transitioned from a slide-in state to a slide-out state, and a wireless communication circuit disposed in the first space and configured to transmit or receive a wireless signal in a designated frequency band via the conductive portion, wherein in the slide-in state, at least a part of the conductive portion is received in the second space to be invisible from the outside to correspond to at least a part of the conductive member, and includes a conductive stub extending from the conductive member, and in the slide-in state, disposed to be connectable through capacitive coupling to at least a part of the conductive portion.

Advantageous Effects

According to embodiments of the disclosure, in a slide-in state, a conductive portion disposed in a first housing and used as an antenna may be capacitively coupled to a conductive stub extending from a conductive member of a second housing, and thus a radiation performance deviation of an antenna according to slide-in/slide-out states may be reduced.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
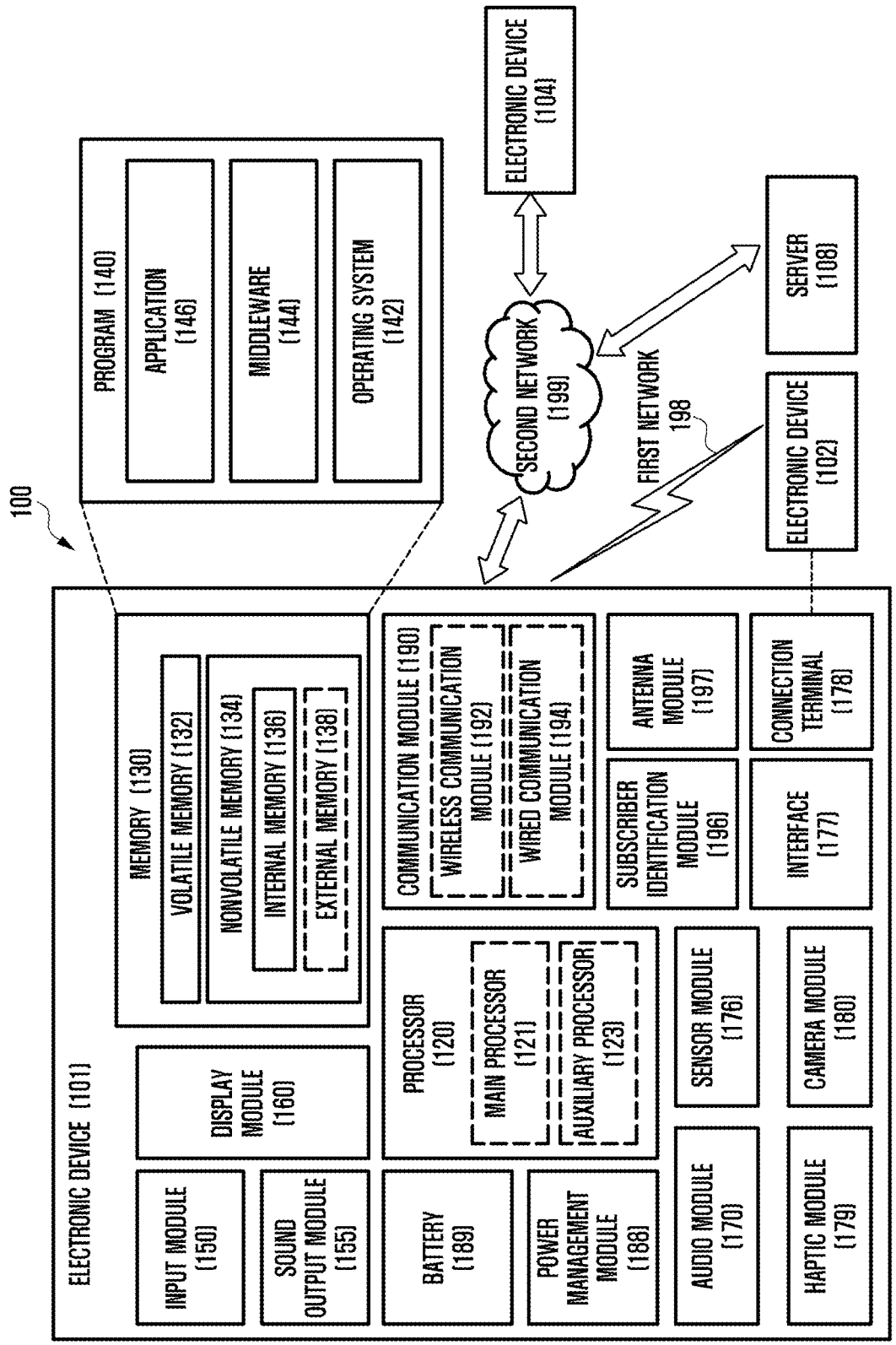
FIG. 1 is a block diagram of an electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
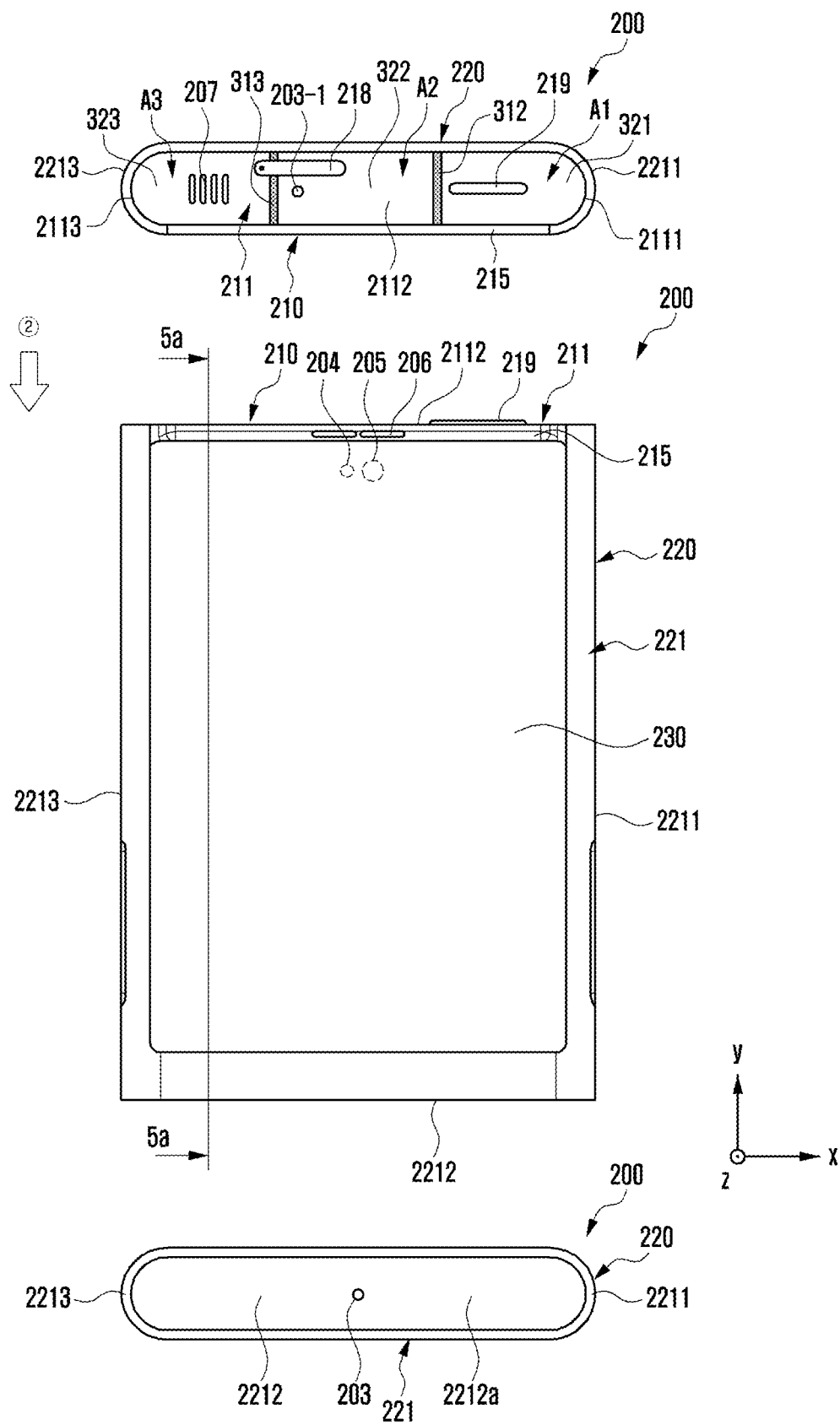
FIGS. 2A and 2B are views illustrating a front surface and a rear surface of an electronic device in a slide-in state, respectively, according to various embodiments of the disclosure.

According to various embodiments, a sensor module 176 may include a moving distance detection sensor configured to detect a moving distance from a second housing (e.g., a second housing 220 of FIG. 2A) to a first housing (e.g., a first housing 210 of FIG. 2A) of an electronic device (e.g., an electronic device 200 of FIG. 2A). According to an embodiment, a processor 120 may detect the moving distance in real time via the sensor module 176 while the first housing 210 is moved from the second housing 220, and control a display device 160 so as to display an object corresponding to a display area being changed via a display (e.g., a flexible display 230 of FIG. 2A). According to an embodiment, an electronic device 101 may include a driving motor control module configured to control an operation of a driving motor (e.g., a driving motor 260 of FIG. 4) disposed in an electronic device. In an embodiment, the driving motor control module may be replaced by the processor 120.

Figure 2B:
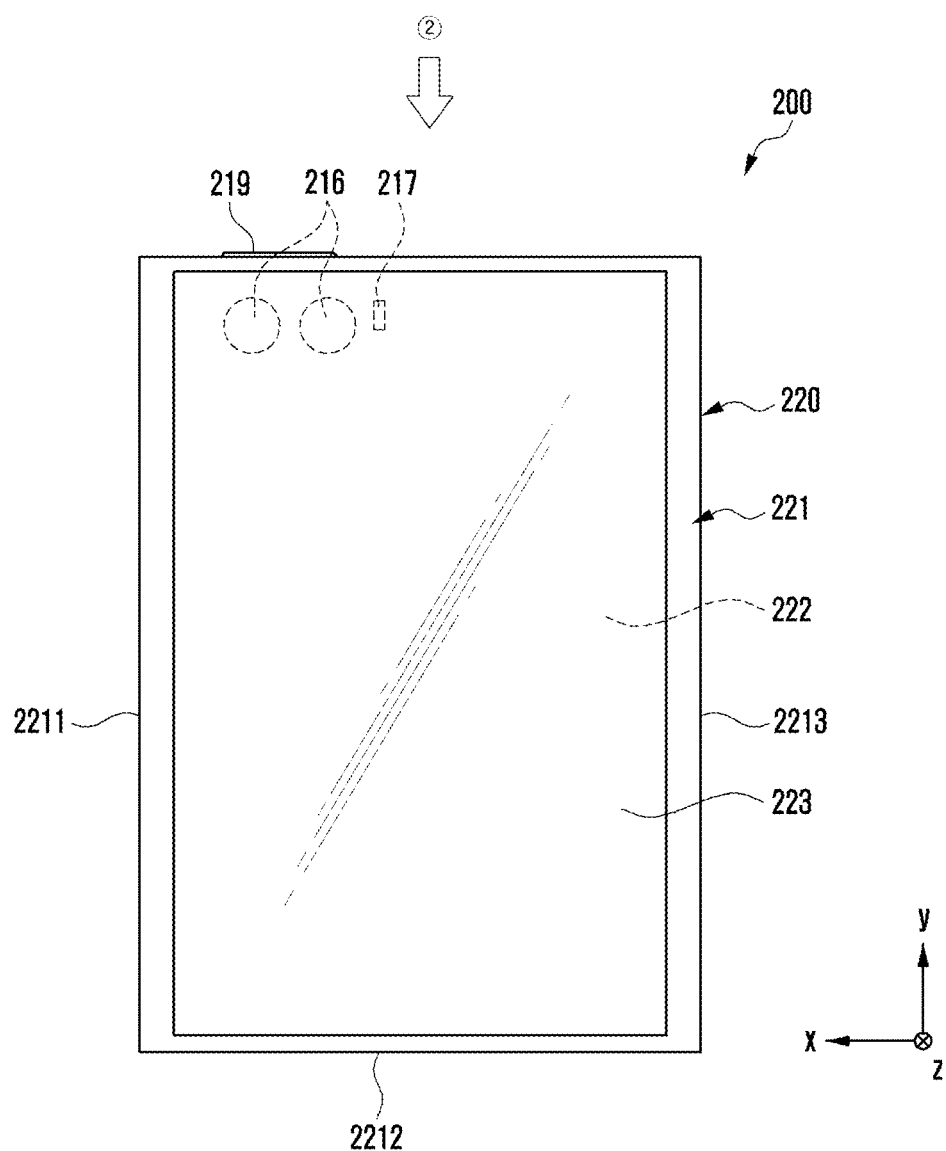

FIGS. 2A and 2B are views illustrating a front surface and a rear surface of an electronic device in a slide-in state, respectively, according to various embodiments of the disclosure.

Figure 3A:
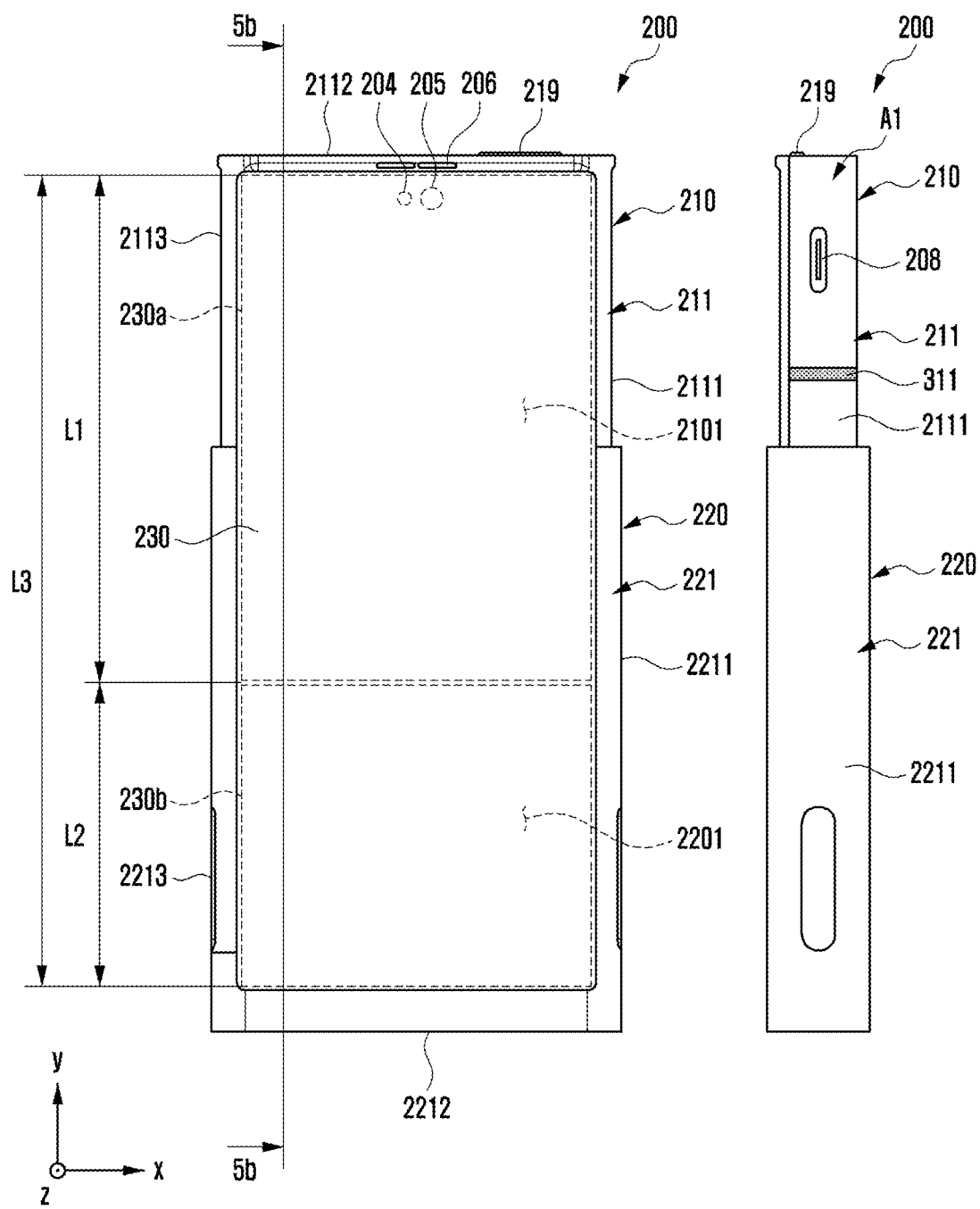
FIGS. 3A and 3B are views illustrating a front surface and a rear surface of an electronic device in a slide-out state, respectively, according to various embodiments of the disclosure.
Figure 3B:
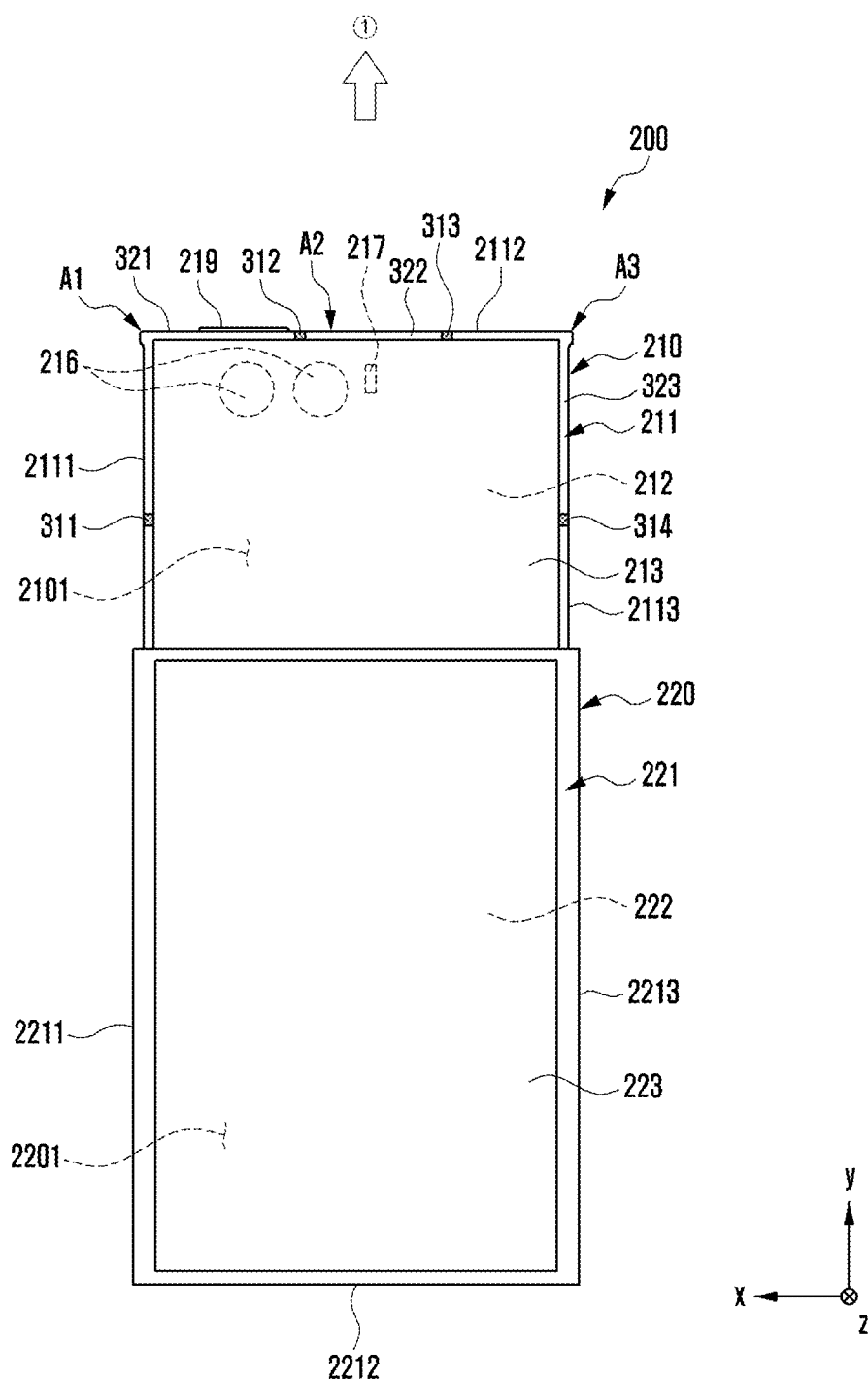

FIGS. 3A and 3B are views illustrating a front surface and a rear surface of an electronic device in a slide-out state, respectively, according to various embodiments of the disclosure.

The electronic device 200 of FIGS. 2A, 2B, 3A, and 3B may be at least partially similar to the electronic device 101 of FIG. 1 or may further include other embodiments of an electronic device.

Referring to FIGS. 2A, 2B, 3A, and 3B, the electronic device 200 may include a first housing 210 (e.g., a first housing structure, a moving unit, or a slide housing), the second housing 220 (e.g., a second housing structure, a fixed unit, or a base housing) slidably coupled to the first housing 210 in a designated direction (e.g., direction ① or direction ②) (e.g., the ±y-axis direction), and a flexible display 230 (e.g., expandable display or extendable display) disposed to be supported by at least a part of the first housing 210 and the second housing 220. According to an embodiment, the electronic device 200 may be configured to allow the first housing 210 to be slid out in a first direction (direction ①) or be slid in in a second direction (direction ②) opposite to the first direction (direction ①), with reference to the second housing 220 gripped by a user. According to an embodiment, at least a part of the first housing 210 including a first space 2101 may be received in a second space 2201 of the second housing 220, and may thus be changed to a slide-in state. According to an embodiment, the electronic device 200, in a slide-out state, may at least partially form the same plane as at least a part of the first housing 210, and in a slide-in state, may include a bendable member (or a bendable support member) (e.g., a bendable member 240 of FIG. 4) (e.g., a multi-joint hinge module or a muti-bar assembly) at least partially received in the second space 2201 of the second housing 220. According to an embodiment, in a slide-in state, at least a part of the flexible display 230 may be received in the second space 2201 of the second housing 220 while being supported by the bendable member (e.g., the bendable member 240 of FIG. 4), and may thus be disposed to be invisible from the outside. According to an embodiment, in a slide-out state, at least a part of the flexible display 230 may be disposed to be visible from the outside while being supported by the bendable member (e.g., the bendable member 240 of FIG. 4) at least partially forming the same plane as the first housing 210.

According to various embodiments, an electronic device 200 may include a first housing 210 including a first lateral member 211 (e.g., a first side surface member) and a second housing 220 including a second lateral member 221 (e.g., a second side surface member). According to an embodiment the first lateral member 211 may include a first side surface 2111 having a first length along a first direction (e.g., the y-axis direction), a second side surface 2112 extending to have a second length shorter than the first length along a direction (e.g., the x-axis direction) substantially perpendicular to the first side surface 2111, and/or a third side surface 2113 extending from the second side surface 2112 to be substantially parallel to the first side surface 2111 and having the first length. According to an embodiment, the first lateral member 2111 may be at least partially configured of a conductive member (e.g., metal). In an embodiment, the first lateral member 211 may be configured by a combination of a conductive member (e.g., a conductive member 211a of FIGS. 6A to 6D) and a non-conductive member (e.g., a non-conductive member 211b of FIGS. 6A to 6D) (e.g., polymer). According to an embodiment, the first housing 210 may include a first support member 212 extending from at least a part of the first lateral member 211 to at least a part of the first space 2101. According to an embodiment, the first support member 212 may be integrally formed with the first lateral member 211. In an embodiment, the first support member 212 may be separately formed from the first lateral member 211 and may be structurally coupled to the first lateral member 211.

According to various embodiments, the second lateral member 221 may include a fourth side surface 2211 at least partially corresponding to the first side surface 2111 and having a third length, a fifth side surface 2212 extending from the fourth side surface 2211 in a direction substantially parallel to the second side surface 2112 and having a fourth length shorter than the third length, and/or a sixth side surface 2213 extending from the fifth side surface 2212 to correspond to the third side surface 2113 and having the third length. According to an embodiment, the second lateral member 221 may be at least partially configured of a conductive member (e.g., metal). In an embodiment, the second lateral member 221 may be configured by a combination of a conductive member and a non-conductive member (e.g., polymer). According to an embodiment, at least a part of the second lateral member 221 may include a second support member 222 extending to at least a part of the second space 2201 of the second housing 220. According to an embodiment, the second support member 222 may be integrally formed with the second lateral member 221. In an embodiment, the second support member 222 may be separately formed from the second lateral member 221, and may be structurally coupled to the second lateral member 221. According to an embodiment, the electronic device 200 may include a side surface cover 2212a disposed to cover at least a portion of the on the fifth side surface 2212 of the second housing 220.

According to various embodiments, the first side surface 2111 and the fourth side surface 2211 may be slidably coupled with respect to each other. According to an embodiment, the third side surface 2113 and the sixth side surface 2213 may be slidably coupled with respect to each other. According to an embodiment, in a slide-in state, the first side surface 2111 may overlap the fourth side surface 2211 and may thus be disposed to be substantially invisible from the outside. According to an embodiment, in a slide-in state, the third side surface 2113 may overlap the sixth side surface 2213 and may thus be disposed to be substantially invisible from the outside. In an embodiment, in a slide-in state, at least a part of the first side surface 2111 and the third side surface 2113 may be disposed to be at least partially visible from the outside. According to an embodiment, in a slide-in state, at least a part of the first support member 212 may overlap the second support member 222.

According to various embodiment, the first housing 210 may include a first rear cover 213 coupled to at least a part of the first lateral member 211. According to an embodiment, the first rear cover 213 may be disposed to be coupled to at least a part of the first support member 212. In an embodiment, the first rear cover 213 may be integrally formed with the first lateral member 211. According to an embodiment, the first rear cover 213 may be configured of a polymer, coated or tinted glass, ceramic, metal (e.g., aluminum, stainless steel (STS), or magnesium), or a combination of at least two of these materials. In an embodiment, the first rear cover 213 may extend to at least a part of the first lateral member 211. In an embodiment, at least a part of the first support member 212 may be replaced by the first rear cover 213.

According to various embodiments, the second housing 220 may include a second rear cover 223 coupled to at least a part of the second lateral member 221. According to an embodiment, the second rear cover 223 may be disposed to be coupled to at least a part of the second support member 222. In an embodiment, the second rear cover 223 may be integrally formed with the second lateral member 221. According to an embodiment, the second rear cover 223 may be configured of a polymer, coated or tinted glass, ceramic, metal (e.g., aluminum, stainless steel (STS), or magnesium), or a combination of at least two of these materials. In an embodiment, the second rear cover 223 may extend to at least a part of the second lateral member 221. In an embodiment, at least a part of the second support member 222 may be replaced by the second rear cover 223.

According to various embodiments, an electronic device 200 may include a flexible display 230 disposed to be supported by at least a part of the first housing 210 and the second housing 220. According to an embodiment, the flexible display 230 may include a first portion 230a (e.g., a flat surface portion) always visible from the outside and a second portion 230b (e.g., a bendable portion) extending from the first portion 230a and at least partially received in the second space 2201 of the second housing 220 so as to be invisible from the outside in a slide-in state. According to an embodiment, at least a part of the first portion 230a may be disposed to be supported by the first housing 210, and the second portion 230b may be disposed to be at least partially supported by a bendable member (e.g., the bendable member 240 of FIG. 4). In an embodiment, at least a part of the first portion 230a may also be disposed to be supported by the bendable member 240. According to an embodiment, the second portion 230b of the flexible display 230 may extend from the first portion 230a while being supported by the bendable member (e.g., the bendable member 240 of FIG. 4) in a state in which the first housing 210 is slid out along the first direction (direction ①), form substantially the same plane as the first portion 230a, and be disposed to be visible from the outside. According to an embodiment, the second portion 230b of the flexible display 230 may be received in the second space 2201 of the second housing 220 in a state in which the first housing 210 is slid in along the second direction (direction ②), and be disposed to be invisible from the outside. Therefore, in the electronic device 200, the first housing 210 may slide from the second housing 220 along a designated direction (e.g., the ±y-axis direction), and thus the display area of the flexible display 230 may be changed.

According to various embodiments, the flexible display 230 may have a variable length in the first direction (direction ①) according to the sliding movement of the first housing 210 moving with reference to the second housing 220. For example, in a slide-in state, the flexible display 230 has a first display area (e.g., the area corresponding to the first portion 230a) corresponding to a first length (L1). According to an embodiment, in a slide-out state, the flexible display 230 may extend to have a third display area (e.g., the area including the first portion 230a and the second portion 230b) greater than the first display area and corresponding to a third length (L3) longer than the first length (L1), according the sliding movement of the first housing 210 additionally moving by a second length (L2) with reference to the second housing 220.

According to various embodiments, the electronic device 200 may include at least one among an input device(e.g., a microphone 203-1), a sound output device(e.g., a call receiver 206 or a speaker 207), sensor modules 204 and 217, a camera module(e.g., a first camera module 205 or a second camera module 216), a connector port 208, a key input device 219, or an indicator (not shown) arranged in the first space 2101 of the first housing 210. According to an embodiment, the electronic device 200 may include another input device (e.g., a microphone 203) disposed in the second housing. In another embodiment, the electronic device 200 may be configured to omit at least one of the elements described above or additionally include other elements. In another embodiment, at least one of the elements described above may be arranged in the second space 2201 of the second housing 220.

According to various embodiments, the input device may include a microphone 203-1. In an embodiment, the input device (e.g., the microphone 203-1) may include a plurality of microphones arranged to be capable of detecting the direction of sound. The sound output device may include, for example, a call receiver 206 and/or a speaker 207. According to an embodiment, the speaker 207 may correspond to the outside through at least one speaker hole configured through the first housing 210, at a position always exposed to the outside regardless of slide-in/slide-out states. According to an embodiment, in a slide-out state, the connector port 208 may correspond to the outside through a connector port hole configured through the first housing 210. In an embodiment, in a slide-in state, the connector port 208 may be configured through the second housing and correspond to the outside through an opening configured to correspond to the connector port hole. In an embodiment, the call receiver 206 may include a speaker (e.g., a piezo speaker) configured to operate without a separate speaker hole.

According to various embodiments, the sensor modules 204 and 217 may produce data values or electrical signals corresponding to an internal operation state or an external environmental state of the electronic device 200. For example, the sensor modules 204 and 217 may include a first sensor module 204 (e.g., a proximity sensor or a light sensor) disposed on the front surface of the electronic device 200 and/or a second sensor module 217 (e.g., a heart rate monitoring (HRM) sensor) disposed on the rear surface of the electronic device 200. According to an embodiment, the first sensor module 204 may be disposed under the flexible display 230 on the front surface of the electronic device 200. According to an embodiment, the first sensor module 204 and/or the second sensor module 217 may include at least one among a proximity sensor, a light sensor, a time of flight (TOF) sensor, an ultrasonic sensor, a fingerprint sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, or a humidity sensor.

According to various embodiments, the camera modules may include the first camera module 205 disposed on the front surface of the electronic device 200 and the second camera module 216 disposed on the rear surface of the electronic device 200. According to an embodiment, the electronic device 200 may include a flash (not shown) positioned adjacent to the second camera module 216. According to an embodiment, the camera modules 205 and 216 may include one or more lenses, image sensors, and image signal processors. According to an embodiment, the first camera module 205 may be configured to be disposed under the flexible display 230 and photograph a subject via a part of an activation area (e.g., a display area) of the flexible display 230.

According to various embodiments, the first camera module 205 of the camera modules and one sensor module 204 among the sensor modules 204 and 217 may be arranged to detect the external environment via the flexible display 230. For example, the first camera module 205 or one sensor module 204 may be disposed to be capable of coming into contact with the external environment through a perforated opening or a transmission area disposed on the flexible display 230, in the first space 2101 of the first housing 210. According to an embodiment, the area, facing the first camera module 205, of the flexible display 230 is a part of the display area configured to display content and may be formed as a transmission area having a designated transmittance. According to an embodiment, the transmission area may be configured to have a transmittance ranging from about 5% to about 20%. The transmission area may be imaged by the image sensor and may include an area overlapping an effective area (e.g., angle of view area) of the first camera module 205, through which light for producing an image passes. For example, the transmission area of the flexible display 230 may include an area in which the arrangement density of pixels and/or wiring density thereof is lower than that of the surrounding area. For example, the transmission area may replace the above-described opening. For example, one camera module 205 may include an under display camera (UDC). In an embodiment, one sensor module 204 may be disposed to perform functions thereof in the inner space of the electronic device 200 via the flexible display 230 without being visually exposed.

According to various embodiments, the slide-in/slide-out operations of the electronic device 200 may be automatically performed. For example, the slide-in/slide-out operations of the electronic device 200 may be performed via a driving motor (e.g., the driving motor 260 of FIG. 4) including a pinion gear disposed in the first space 2101 of the first housing 210 and a gearing operation of a rack gear (e.g., a rack gear 2251 of FIG. 4) disposed in the second space 2201 of the second housing 220 and gear-coupled to the pinion gear. In an embodiment, the driving motor 260 may be disposed in the second space 2201, and the rack gear 2251 may be disposed in the first space 2101. For example, in case of detecting a triggering operation for changing from a slide-in state to a slide-out state or changing from a slide-out state to a slide-in state, the processor (e.g., the processor 120 of FIG. 1) of the electronic device 200 may operate the driving motor 260 disposed in the electronic device 200. According to an embodiment, the triggering operation may select (e.g., touch) an object displayed on the flexible display 230, or may include an operation of a physical button (e.g., a key button) included in the electronic device 200. In an embodiment, the electronic device 200 may include a manual slide module (e.g., a hinge module using a spring), and the slide-in/slide-out operations may be performed manually via a user's operation.

According to various embodiments, the electronic device 200 may include at least one conductive portion 321, 322, and 323 (e.g., a metal material or a conductive member) segmented via a plurality of segmentation portions 311, 312, 313, and 314 (e.g., a polymer, a non-conductive member, or a segmentation portion) in the first lateral member 211. In an embodiment, at least a part of the plurality of segmentation portions 311, 312, 313, and 314 and/or at least a part of the at least one conductive portion 321, 322, and 323 may be concealed by a dielectric cover 215 disposed on the first housing 210 so as to be invisible from the outside. According to an embodiment, the dielectric cover 215 may physically separate the at least one conductive portion 321, 322, or 323 from the second housing 220 during a sliding operation. According to an embodiment, in the first space 2101, the at least one conductive portion 321, 322, and 323 may be electrically connected to a wireless communication circuit (e.g., the wireless communication module 192 of FIG. 1) disposed on a first substrate (e.g., a first substrate 251 of FIG. 4), and may thus be operated as at least one antenna (A1, A2, and A3). According to an embodiment, the wireless communication module 192 may be configured to transmit or receive wireless signals in at least one designated frequency band (e.g., about 600 MHz to 9000 MHz) (e.g., a legacy band or an NR band) via at least one conductive portion 321 and 322. In an embodiment, the electronic device 200 may further include at least one antenna module (e.g., a 5G antenna module or an antenna structure) disposed in an inner space (e.g., the first space 2101 or the second space 2201) and disposed to transmit or receive wireless signals in a frequency band ranging from about 3 GHz to 100 GHz via another wireless communication circuit (e.g., the wireless communication module 192 of FIG. 1).

According to various embodiments, at least one conductive portion 321, 322, and 323 may include a first conductive portion 321 configured to operate as a first antenna (A1) and segmented by the first segmentation portion 311 disposed on the first side surface 2111 and the second segmentation portion 312 disposed on the second side surface 2112, the second conductive portion 322 configured to operate as a second antenna (A2) and segmented by the second segmentation portion 312 and the third segmentation portion 313 disposed on the second side surface 2112 to be spaced apart from the second segmentation portion 312, and the third conductive portion 323 configured to operate as a third antenna (A3) and segmented by the third segmentation portion 313 and a fourth segmentation portion 314 disposed on the third side surface 2113. In an embodiment, in a case where the number of a plurality of segmentation portions is greater, the electronic device 200 may include four or more antennas via four or more conductive portions. In an embodiment, the electronic device 200 may include one or two antennas configured to operate via one or two conductive portions arranged via one or two segmentation portions.

According to various embodiments, in a slide-in state, the first side surface 2111 and the third side surface 2113 may be received in the second space 2201 and may be at least partially concealed by a conductive member of the second housing 220. Therefore, in a slide-in state, the first antenna (A1) using a part of the first side surface 2111 and/or the third antenna (A3) using a part of the third side surface 2113 may be concealed by a conductive member, and thus the radiation performance may be reduced.

According to embodiments of the disclosure, in the electronic device 200, in a slide-in state, a conductive stub (e.g., a conductive stub 331 of FIG. 6A) extending from a conductive member of the second housing 220 may be capacitively coupled to the first conductive portion 321, and thus compensation for the electrical length may help reduce a radiation performance deviation of the first antenna (A1) according to slide-in/slide-out states.

Figure 4:
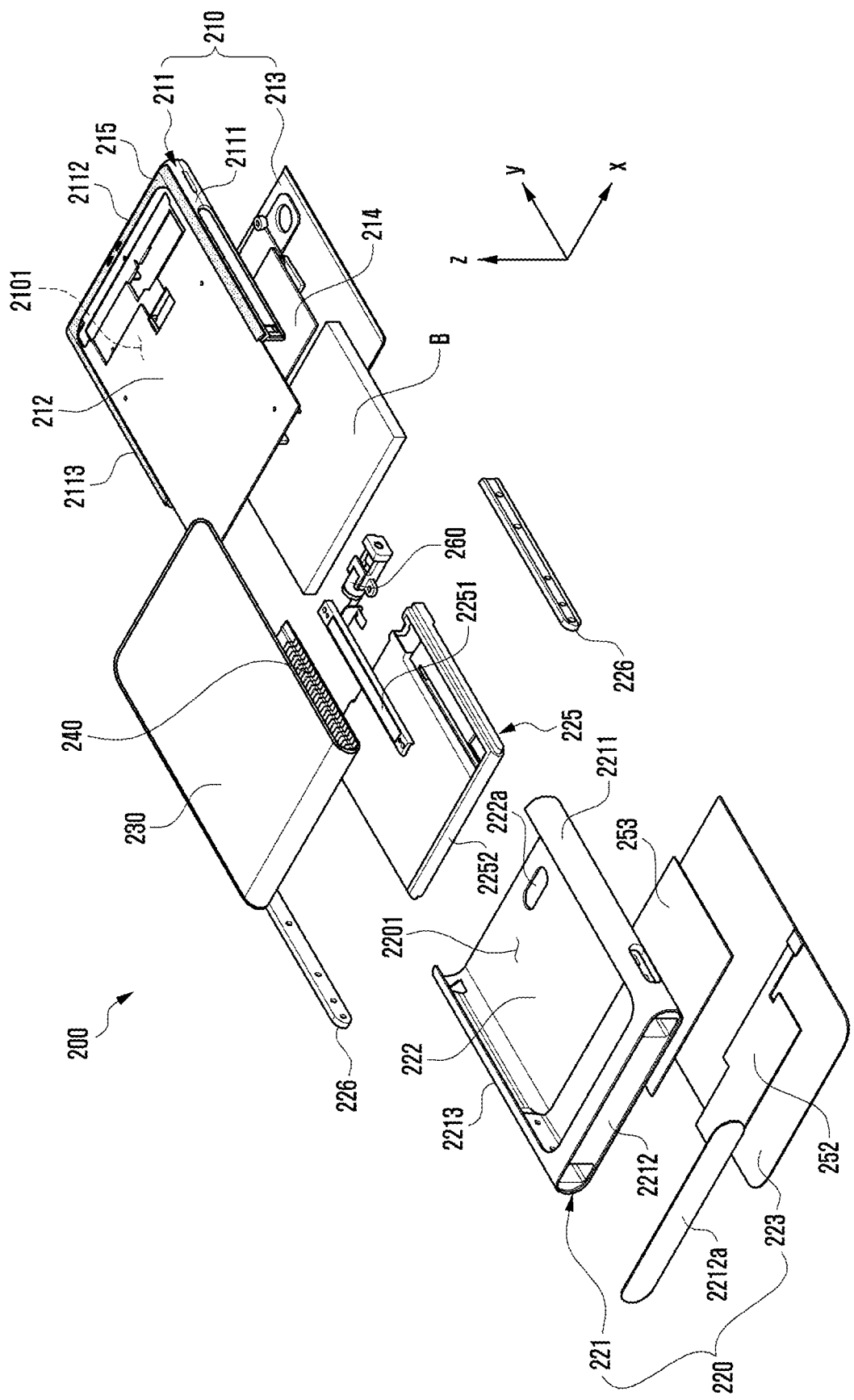
FIG. 4 is an exploded perspective view of an electronic device according to an embodiment of the disclosure.

FIG. 4 is an exploded perspective view of an electronic device according to an embodiment of the disclosure.

In describing an electronic device 200 of FIG. 4, the same reference numerals have been used for the components substantially the same as the components of the electronic device 200 of FIGS. 2A, 2B, 3A, and 3B, and the detailed descriptions may be omitted.

Referring to FIG. 4, an electronic device 200 may include a first housing 210 including a first space 2101, a second housing 220 slidably coupled to the first housing 210 and including a second space 2201, a bendable member 240 disposed in the second space 2201 to be at least partially rotatable, a flexible display 230 disposed to be supported by at least a part of the bendable member 240 and the first housing 210, and a driving module configured to drive the first housing 210 in a direction (e.g., the −y-axis direction) of being slid in to the second housing 220 and/or a direction (e.g., the y-axis direction) of being slid out from the second housing 220. According to an embodiment, the first housing 210 may include a first lateral member 211 and a first rear cover 213 coupled to at least a part of the first lateral member 211 (e.g., at least a part of a first support member 212). According to an embodiment, the second housing 220 may include a second lateral member 221 and a second rear cover 223 coupled to at least a part of the second lateral member 221 (e.g., at least a part of a second support member 222). According to an embodiment, the driving module may include a driving motor 260 disposed in the first space 2101 and including a pinion gear and a rack gear 2251 disposed in the second space 2201 to be engaged with the pinion gear. According to an embodiment, the driving module may be coupled to the driving motor 260, and thus may further include a deceleration module configured to reduce a rotation speed and disposed to increase driving force. According to an embodiment, the driving motor 260 may be disposed to be supported by at least a part of the first support member 212 in the first space 2101 of the first housing 210. According to an embodiment, the driving motor 260 may be fixed to an end (e.g., an edge) of the first support member 212 in the first space 2101 in the slide-in direction (e.g., −y-axis direction).

According to various embodiments, the electronic device 200 may include a plurality of electronic components arranged in the first space 2101. According to an embodiment, the plurality of electronic components may include at least one among a first substrate 251(e.g., a main substrate), a battery (B) disposed at the periphery of the first substrate 251, a camera module (e.g., the first camera module 205 of FIG. 2A and/or the second camera module 216 of FIG. 3B), a socket module (e.g., a socket module 218 of FIG. 2A) (e.g., a SIM tray), a speaker (e.g., a speaker 207 and/or a receiver 206 of FIG. 2A), a key button (e.g., a key input device 219 of FIG. 3A) (e.g., a key button capable of recognizing a fingerprint), at least one sensor module (e.g., a sensor module 204 of FIG. 3A and/or a sensor module 217 of FIG. 3B), and a connector port (e.g., the connector port 208 of FIG. 3A). According to an embodiment, the plurality of electronic components may be arranged at the periphery of the first substrate 251 together with the driving motor 260 in the first space 2101 of the first housing 210, thereby enabling an efficient electrical connection.

According to various embodiments, the electronic device 200 may include a rear bracket 214 disposed to cover at least a part of a plurality of electronic components arranged between the first support member 212 and the first rear cover 213 in the first housing 210. According to an embodiment, the rear bracket 214 may be structurally coupled to at least a part of the first support member 212. In an embodiment, the rear bracket 214 may be omitted. According to an embodiment, the rear bracket 214 may cover the plurality of electronic components, and be disposed to support the first rear cover 213.

According to various embodiments, the electronic device 200 may be disposed in the second space 2201 of the second housing 220, and include a support bracket 225 (e.g., a display support bar (DSB)) of a plate type, the support bracket 225 being slidably coupled to at least a part of the first support member 212. According to an embodiment, the support bracket 225 may include the rack gear 2251 disposed to be coupled to a pinion gear of the driving motor 260. According to an embodiment, the rack gear 2251 may be fixed to the support bracket 225, or be integrally formed with the support bracket 225. According to an embodiment, the support bracket 225 may include a support portion 2252 to guide at least a portion of the second portion 230b of the flexible display 230 to the second space 2201 and to induce a smooth sliding motion of the flexible display 230. According to an embodiment, the electronic device 200 may include a pair of guide rails 226 arranged at opposite sides of the support bracket 225 to guide opposite ends of the bendable member 240 in a sliding direction. According to an embodiment, the electronic device 200 may include a side surface cover 2212a disposed to cover at least a portion of the on the fifth side surface 2212 of the second housing 220.

According to various embodiments, when the electronic device 200 is in a slide-in state, in the second support member 222, the second housing 220 may include a camera module 216 disposed in the first housing 210 and/or a first opening 222a (e.g., a through hole, a notch portion, or an open portion) disposed in an area corresponding to a sensor module 217. According to an embodiment, when the electronic device 200 is in a slide-in state, the camera module 216 and/or the sensor module 217 may detect the external environment through the first opening 222a configured through the second housing 220. The area of the second rear cover 223, corresponding at least to the camera module 216 and/or the sensor module 217 may be transparently processed.

According to various embodiments, the electronic device 200 may include an antenna member 253 and a second substrate 252 (e.g., a sub substrate) disposed between the second support member 222 and the second rear cover 223 in the second housing 220. According to an embodiment, the second substrate 252 and the antenna member 253 may be arranged on at least a part of the second support member 222. According to an embodiment, the second substrate 252 and the antenna member 253 may be electrically connected to the first substrate 251 via at least one electrical connection member (e.g., a flexible printed circuit board (FPCB) or a flexible RF cable). According to an embodiment, the antenna member 253 may include a multi-function coil (MFC) (or multi-function core) antenna configured to perform a wireless charging function, a near field communication (NFC) function, and/or an electronic payment function. In an embodiment, the antenna member 253 may be electrically connected to the second substrate 252 and may thus be electrically connected to the first substrate 251 via the second substrate 252.

Figure 5A:
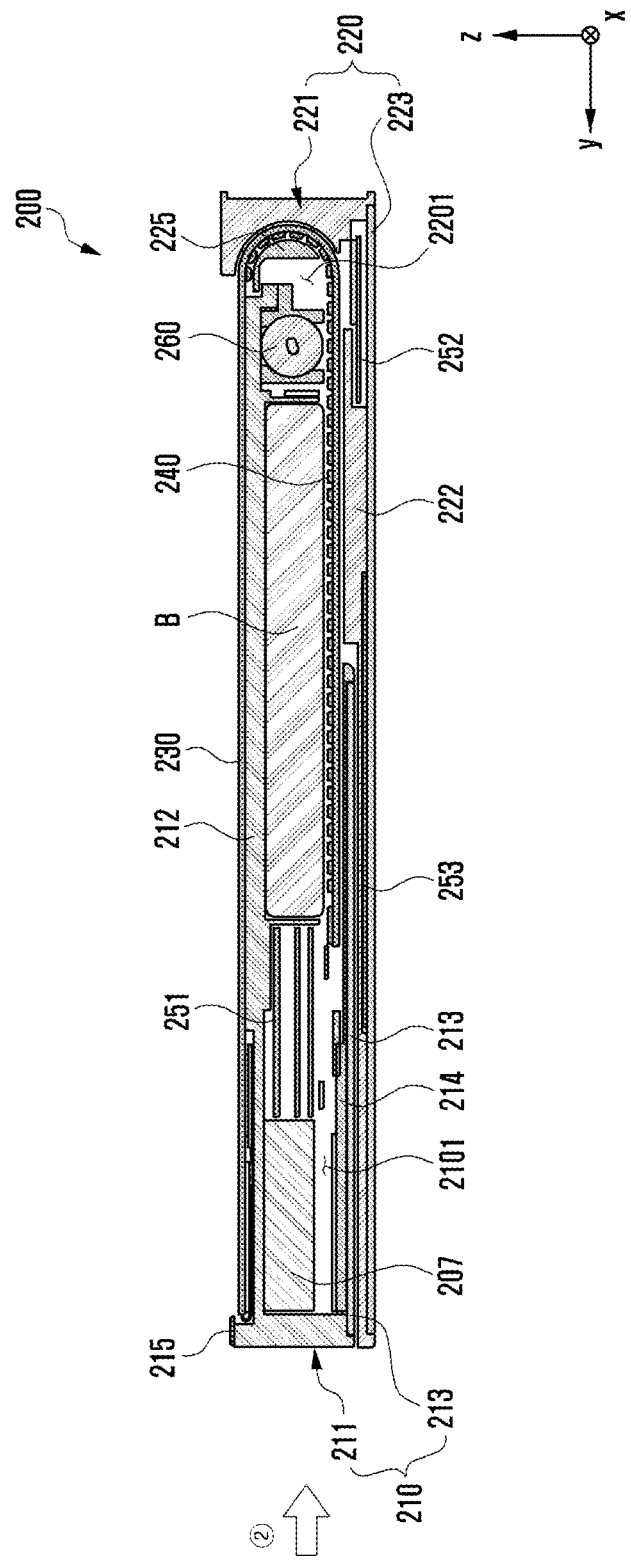
FIG. 5A is a cross-sectional view of the electronic device taken along line 5a-5a of FIG. 2A according to an embodiment of the disclosure.
Figure 5B:
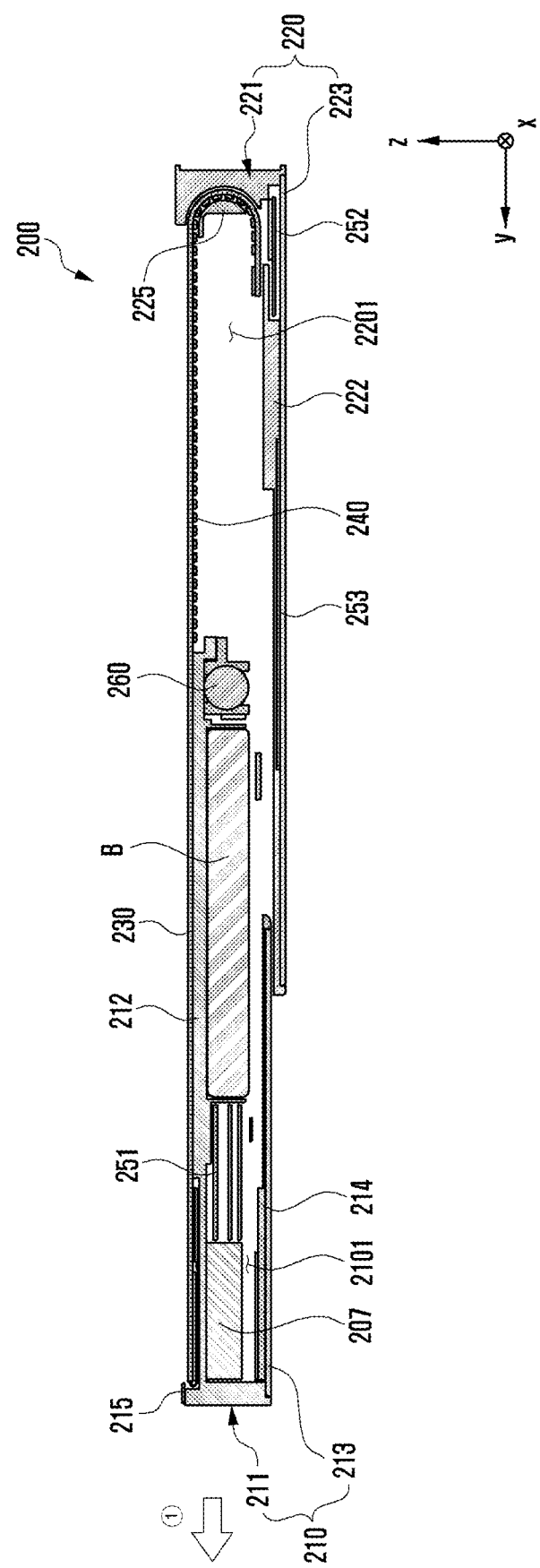
FIG. 5B is a cross-sectional view of the electronic device taken along line 5b-5b of FIG. 3A according to an embodiment of the disclosure.

FIG. 5A is a cross-sectional view of the electronic device taken along line 5a-5a of FIG. 2A according to an embodiment of the disclosure. FIG. 5B is a cross-sectional view of the electronic device taken along line 5b-5b of FIG. 3A according to an embodiment of the disclosure.

In describing the electronic device of FIGS. 5A and 5B, the same reference numerals have been used for the components substantially the same as the components of the electronic device of FIG. 4, and the detailed descriptions may be omitted.

Referring to FIGS. 5A and 5B, an electronic device 200 may include a first housing 210 having a first space 2101, a second housing 220 having a second space 2201, a bendable member 240 connected to the first housing 210 and at least partially received in the second space 2201 in a slide-in state, a flexible display 230 disposed to be supported by at least a part of the bendable member 240 and at least a part of the first housing 210, and a driving motor 260 disposed in the first space 2101 and including a pinion gear gear-coupled to a rack gear (e.g., a rack gear 2251 of FIG. 6A) in the second space 2201. According to an embodiment, the driving motor 260 may automatically move the first housing 210 in a slide-in direction (direction ②) or a slide-out direction (direction ①) with reference to the second housing 220.

According to various embodiments, in a slide-in state, at least a part of the first housing 210 may be received in the second space 2201 of the second housing 220. According to an embodiment, the first support member 212 may receive a guide of the support bracket 225 slidably coupled and disposed in the second space 2201. At least a part of the flexible display 230 may be received in the second space 2201 together with the bendable member 240, and may thus be disposed to be invisible from the outside. The first display area of the flexible display 230 may be exposed to the outside.

According to various embodiments, at least a part of the first housing 210 may be transitioned to a slide-out state of being at least partially exposed to the outside of the second housing 220 along the first direction (direction ①), by the driving of the driving motor 260. According to an embodiment, in a slide-out state, the flexible display 230 may be supported by the support bracket 225 and move together with the bendable member 240, and thus a portion thereof introduced in the second space 2201 may be at least partially exposed to the outside. In the flexible display 230, the second display area greater than the first display area may be exposed to the outside.

Figure 6A:
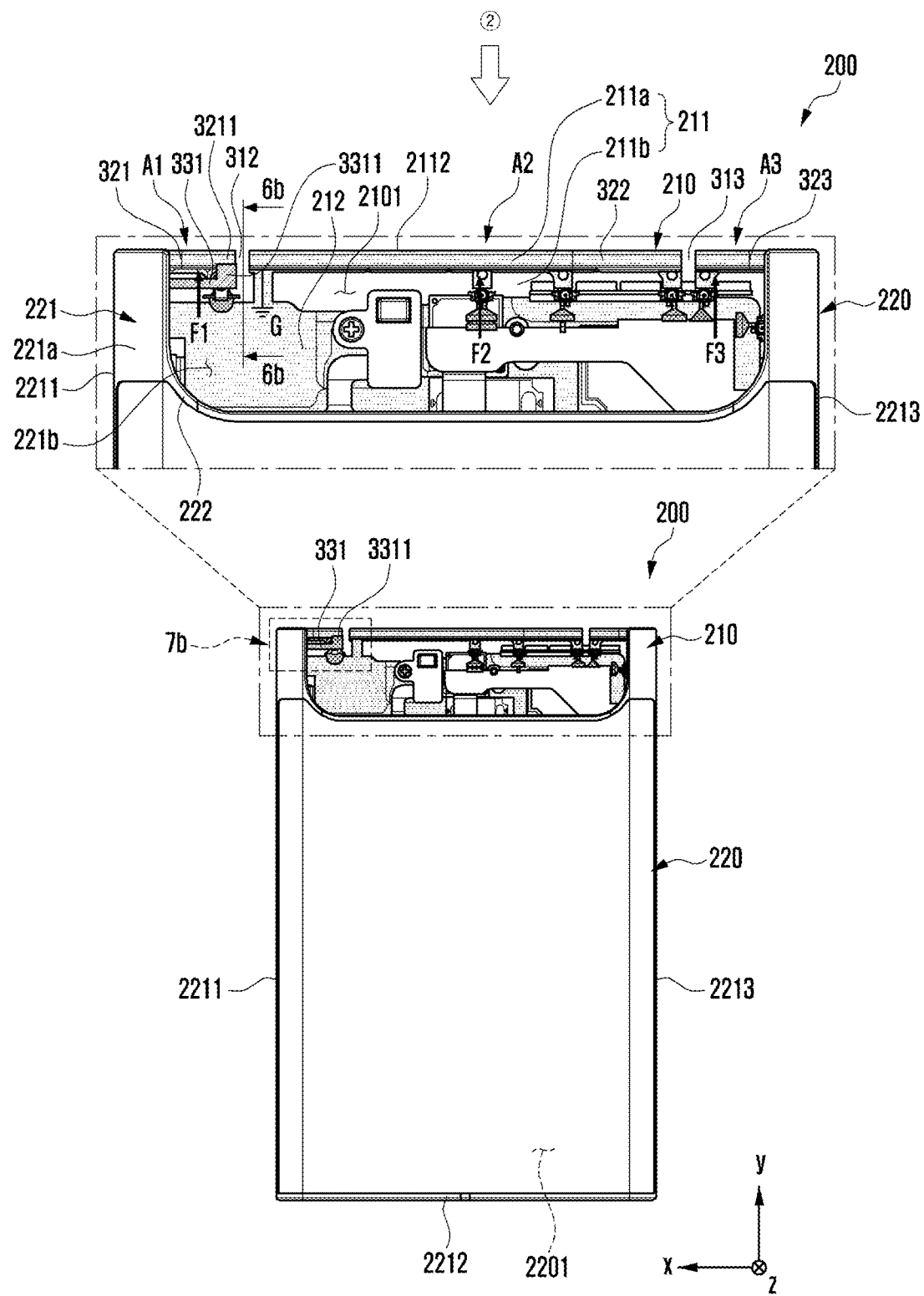
FIG. 6A is a configuration view illustrating a slide-in state of an electronic device including an antenna according to an embodiment of the disclosure.
Figure 6B:
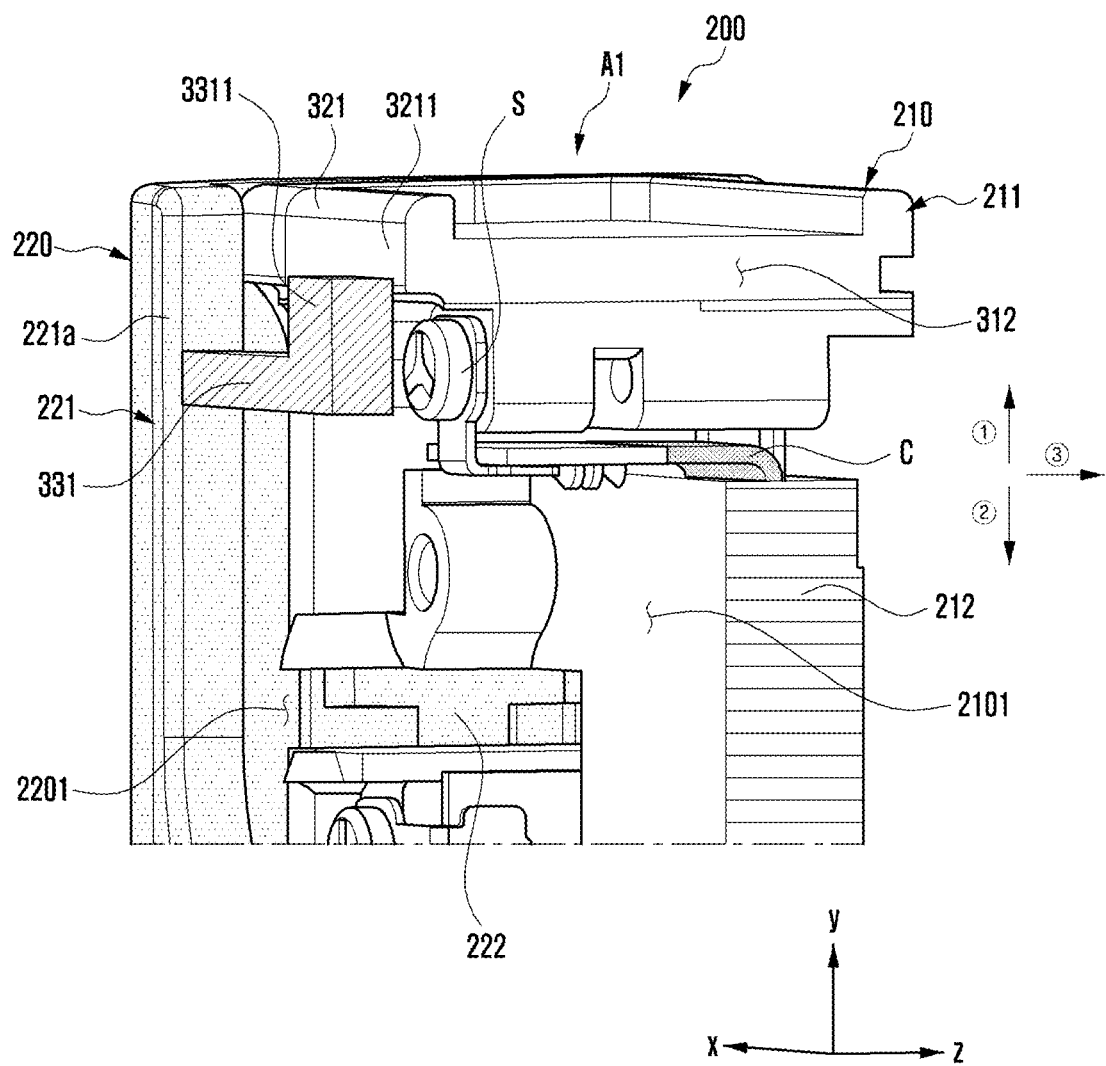
FIGS. 6B and 6C are a partial cross-sectional view and a partial cross-sectional perspective view of an electronic device taken along ling 6b-6b of FIG. 6A, respectively, according to various embodiments of the disclosure.
Figure 6C:
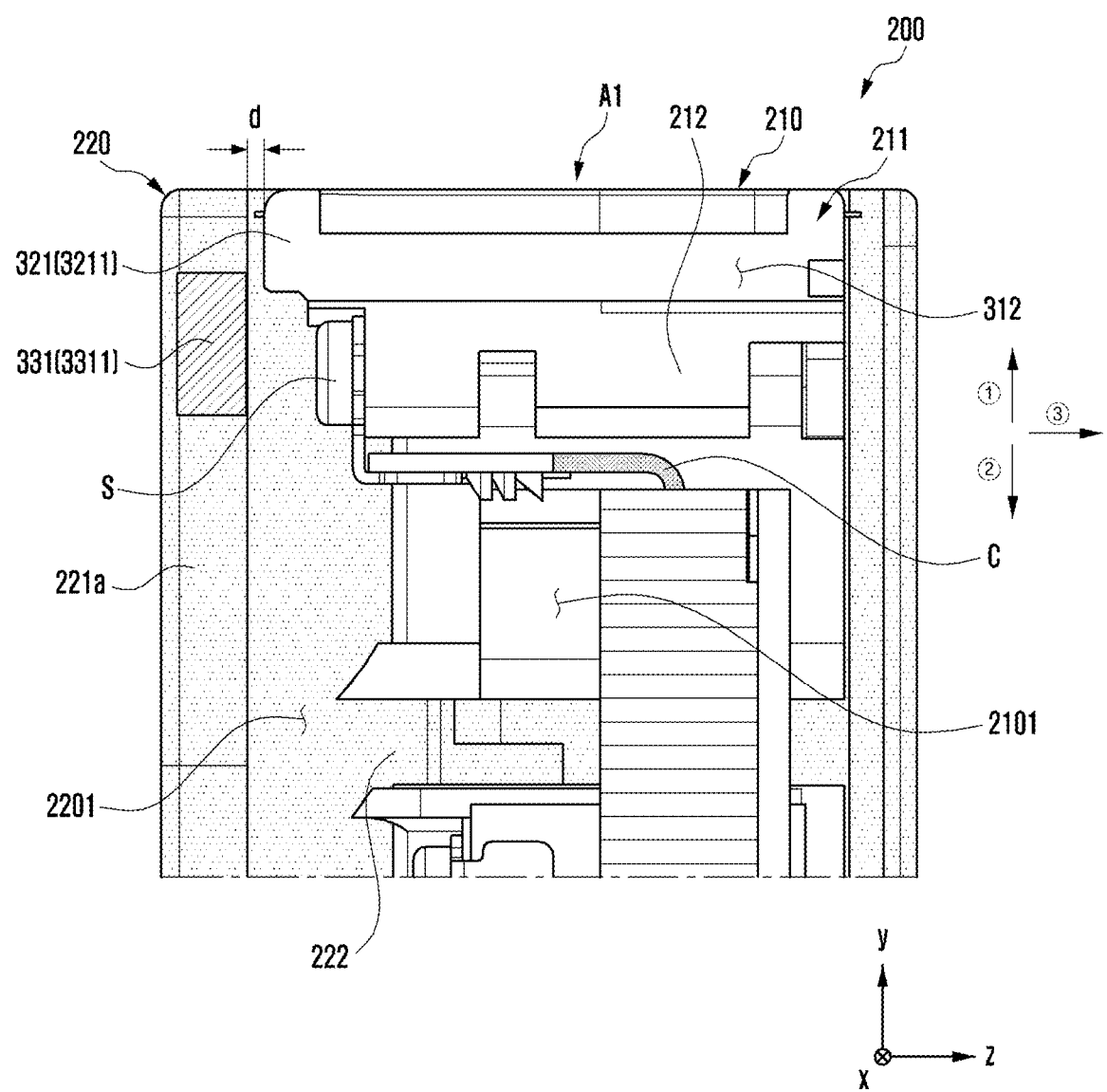
Figure 6D:
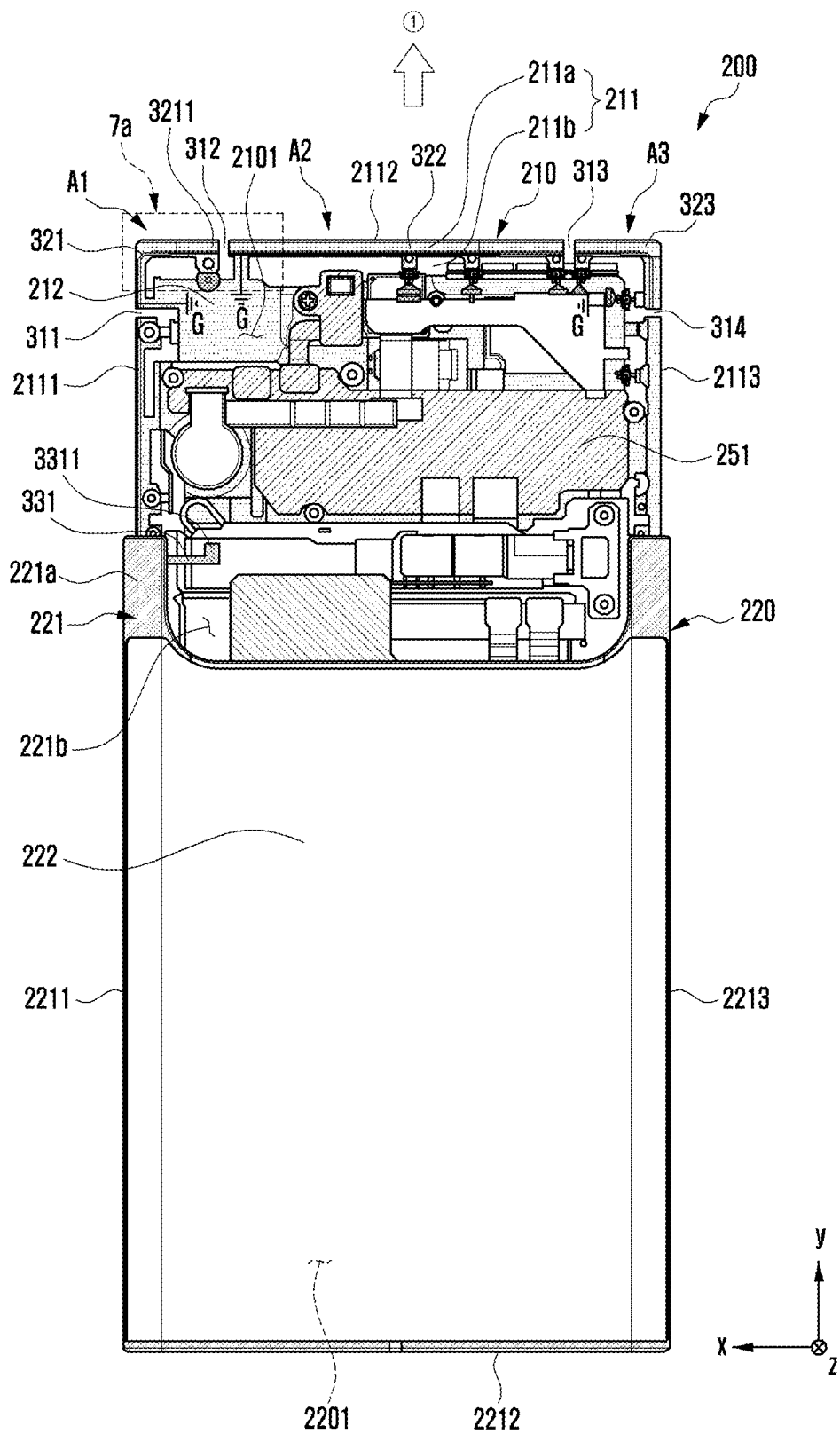
FIG. 6D is a configuration view illustrating a slide-out state of an electronic device including an antenna according to an embodiment of the disclosure.

FIG. 6A is a configuration view illustrating a slide-in state of an electronic device including an antenna according to an embodiment of the disclosure. FIGS. 6B and 6C are a partial cross-sectional view and a partial cross-sectional perspective view of an electronic device taken along ling 6b-6b of FIG. 6A, respectively, according to various embodiments of the disclosure. FIG. 6D is a configuration view illustrating a slide-out state of an electronic device including an antenna according to an embodiment of the disclosure.

In describing an electronic device of FIGS. 6A to 6D, the same reference numerals have been used for the components substantially the same as the components of the electronic device of FIGS. 2A, 2B, 3A, and 3B, and the detailed descriptions may be omitted.

Referring to FIGS. 6A to 6D, an electronic device 200 may include a first housing 210 and a second housing 220 slidably coupled to the first housing 210. According to an embodiment, the electronic device 200 may be configured to allow the first housing 210 to be slid out (slide-out) in a first direction (direction ①) or be slid in (slide-in) in a second direction (direction ②), opposite to the first direction (direction ①), with reference to the second housing 220 gripped by a user.

According to various embodiments, the first housing 210 may include a first lateral member 211 including a first side surface 2111, a second side surface 2112 and a third side surface 2113. According to an embodiment, the first lateral member 211 may include a first support member 212 at least partially extending to the first space 2101. According to an embodiment, the first lateral member 211 may at least partially include a conductive member 211a (e.g., metal) and a non-conductive member 211b (e.g., polymer) coupled (e.g., injection molded) to the conductive member 211a. In an embodiment, segmentation portions 311, 312, 313, and 314 described below may also be configured as the non-conductive member 211b. According to an embodiment, at least a part of the first side surface 2111, the second side surface 2112, and the third side surface 2113 may be configured as the conductive member 211a exposed to the outside.

According to various embodiments, the second housing 220 may include a second lateral member 221 including a fourth side surface 2211 corresponding to the first side surface 2111 in a slide-in state, a fifth side surface 2212 extending from the fourth side surface 2211, and a sixth side surface 2213 corresponding to the third side surface 2113 in a slide-in state. According to an embodiment, the second lateral member 221 may include a second support member 222 at least partially extending to the second space 2201. According to an embodiment, the second housing 220 may be generally configured of a conductive member 221a and include a second opening 221b which is at least partially open. According to an embodiment, at least a part of the conductive member 221a may be electrically connected to a ground of a substrate (e.g., the second substrate 252 of FIG. 4). For example, the fourth side surface 2211, the fifth side surface 2212, the sixth side surface 2213, and at least a part of the second support member 222 may be configured of the conductive member 221a, and in a slide-in state, a partial area corresponding to the first support member 212 may be configured as the second opening 221b. According to an embodiment, the second opening 221b may be filled with a non-conductive member (e.g., injected object), and may thus be concealed to be invisible from the outside by a rear cover (e.g., the second rear cover 223 of FIG. 4) or to be prevented from being exposed to the outside.

According to various embodiments, the first lateral member 211 may include a first conductive portion 321 segmented by the first segmentation portion 311 disposed on the first side surface 2111 and the second segmentation portion 312 disposed on the second side surface 2112, a second conductive portion 322 segmented by the second segmentation portion 312 and the third segmentation portion 313 disposed on the second side surface 2112 to be spaced apart from the second segmentation portion 312, and a third conductive portion 323 segmented by the third segmentation portion 313 and the fourth segmentation portion 314 disposed on the third side surface 2113. According to an embodiment, the first conductive portion 321 may operate as a first antenna (A1) via a first feeding unit (F1). According to an embodiment, the second conductive portion 322 may operate as a second antenna (A2) via a second feeding unit (F2). According to an embodiment, the third conductive portion 323 may operate as a third antenna (A3) via a third feeding unit (F3). According to an embodiment, the first conductive portion 321 may be electrically connected to a wireless communication circuit (e.g., the wireless communication module 192 of FIG. 1) via an electrical connection member (C) (e.g., a flexible printed circuit board (FPCB) or a flexible RF cable (FRC)) and/or a fastening member (S) (e.g., a screw). The second conductive portion 322 and/or the third conductive portion 323 may also be electrically connected to the wireless communication circuit (i.e., wireless communication module 192) in substantially the same manner. According to an embodiment, the first feeding unit (F1), the second feeding unit (F2), and/or the third feeding unit (F3) may be electrically connected to the wireless communication circuit (i.e., wireless communication module 192) (e.g., RFIC) disposed on the first substrate 251 (e.g., a main substrate) in the first space 2101 of the first housing 210. According to an embodiment, the wireless communication circuit (i.e., wireless communication module 192) may be configured to transmit or receive a wireless signal in at least one designated frequency band via the first conductive portion 321, the second conductive portion 322, and/or the third conductive portion 323. According to an embodiment, at least one designated frequency band may include a band (e.g., a legacy band or an NR band) ranging from about 600 MHz to 9000 MHz. According to an embodiment, the first conductive portion 321, the second conductive portion 322, and/or the third conductive portion 323 may be connected to a ground (G) (e.g., the ground of the first substrate 251) of an electronic device in a designated position, thereby helping determine an operation frequency band.

According to various embodiments, the electronic device 200 may include a conductive stub 331 having a length extending from the conductive member 221a of the second housing 220 to the second space 2201. According to an embodiment, the conductive stub 331 may be integrally formed with the conductive member 221a. In an embodiment, the conductive stub 331 may be separately formed from the conductive member 221a and be physically fixed to the conductive member 221a via structural coupling. According to an embodiment, the conductive stub 331 may be spaced apart from the first conductive portion 321 so as to be electromagnetically disconnected therefrom in a slide-out state, and be disposed at a position capable of being capacitively coupled to the first conductive portion 321 in a slide-in state. According to an embodiment, in a slide-in state, the conductive stub 331 may be disposed at a position where a first edge 3311, which is an end thereof, is capable of being capacitively coupled to a second edge 3211 which is an end (e.g., an end of the first conductive portion 321 adjacent to the second segmentation portion 312) of the first conductive portion 321. According to an embodiment, the conductive stub 331 may be electrically connected to a ground via the conductive member 221a. According to an embodiment, the conductive stub 331 may extend from the conductive member 221a to the second opening 221b to have a designated length.

According to various embodiments, in a slide-in state, the first edge 3311 of the conductive stub 331 may be disposed to be capable of being capacitively coupled to the second edge 3211 along the third direction (direction ③) perpendicular to the first direction (direction ①). In a slide-in state, the first edge 3311 may maintain a state physically separated from the second edge 3211 by an interval (d) capable of being capacitively coupled. In an embodiment, in a slide-in state, the first edge 3311 of the conductive stub 331 may be disposed to be capable of being capacitively coupled to the second edge 3211 along the first direction (direction ①). In an embodiment, in a slide-in state, the first edge 3311 may be disposed to be spaced apart from the second edge 3211 and capable of being capacitively coupled along the first direction (direction ①) and the third direction (direction ③).

According to various embodiments, in a slide-in state, the first feeding unit (F1) may be disposed at a position which does not overlap the conductive member 221a of the second housing 220. For example, the first feeding unit (F1) may be disposed at a position adjacent to the second side surface 2112 of the first housing 210. According to an embodiment, the first feeding unit (F1) may be disposed in the first housing 210, and when viewed in the z-axis direction, be disposed at a position overlapping the second opening 221b filled with the non-conductive member (i.e., injected object), thereby reducing the deterioration of the radiation performance of the first antenna (A1) due to the proximity or concealing of the conductive member 221a of the second housing 220 in a slide-in state. According to an embodiment, the second feeding unit (F2) connected to the second conductive portion 322 and the third feeding unit (F3) connected to the third conductive portion 323 may also be arranged in substantially the same manner.

According to various embodiments, in a slide-in state, at least a part of, the first side surface 2111 and the third side surface 2113 may be received in the second space 2201 and be at least partially concealed by the conductive member 221a of the second housing 220. Therefore, in a slide-in state, the first antenna (A1) using a part of the first side surface 2111 may overlap at least a part of the conductive member 221a, and thus the radiation performance may be reduced.

According to an embodiment of the disclosure, in the electronic device 200, in a slide-in state, the conductive stub 331 extending from the conductive member 221a of the second housing 220 may be capacitively coupled to the first conductive portion 321, thereby compensating for the electrical length and helping reduce a radiation performance deviation of the first antenna (A1) according to slide-in/slide-out states.

Figure 7A:
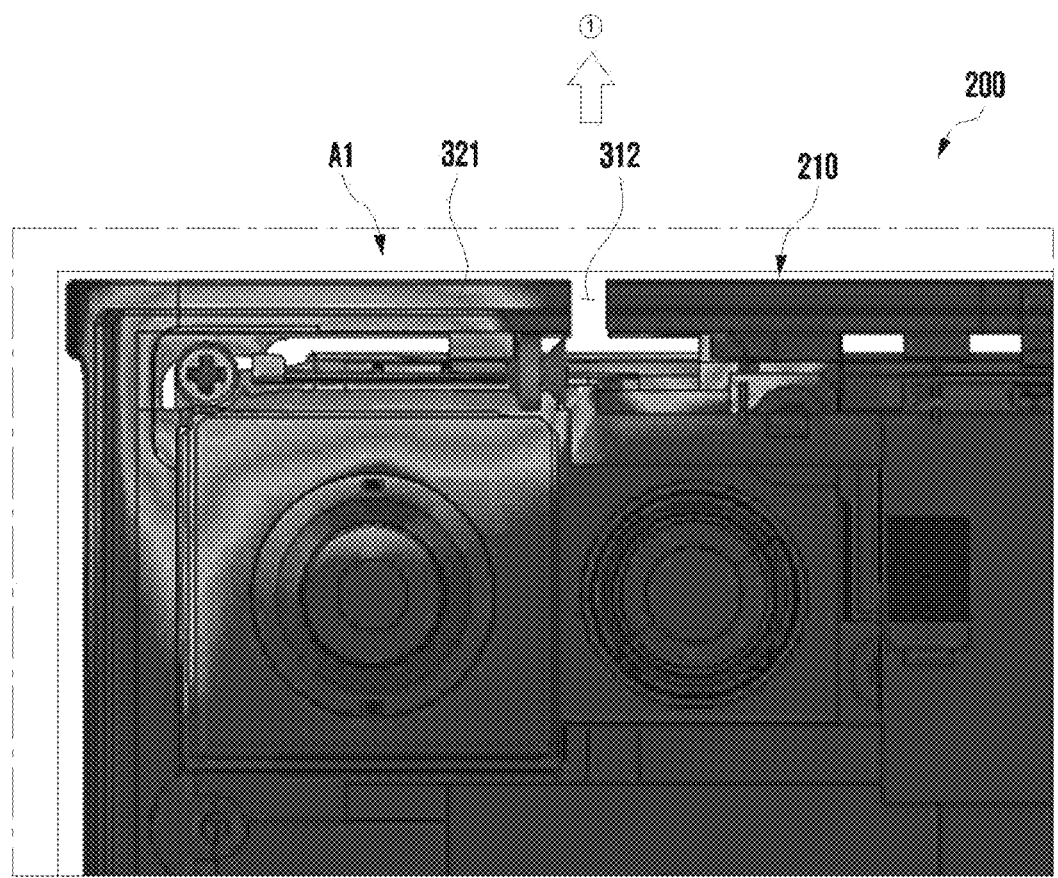
FIG. 7A is a view illustrating the current distribution of an antenna with respect to area 7a of FIG. 6D according to an embodiment of the disclosure.
Figure 7B:
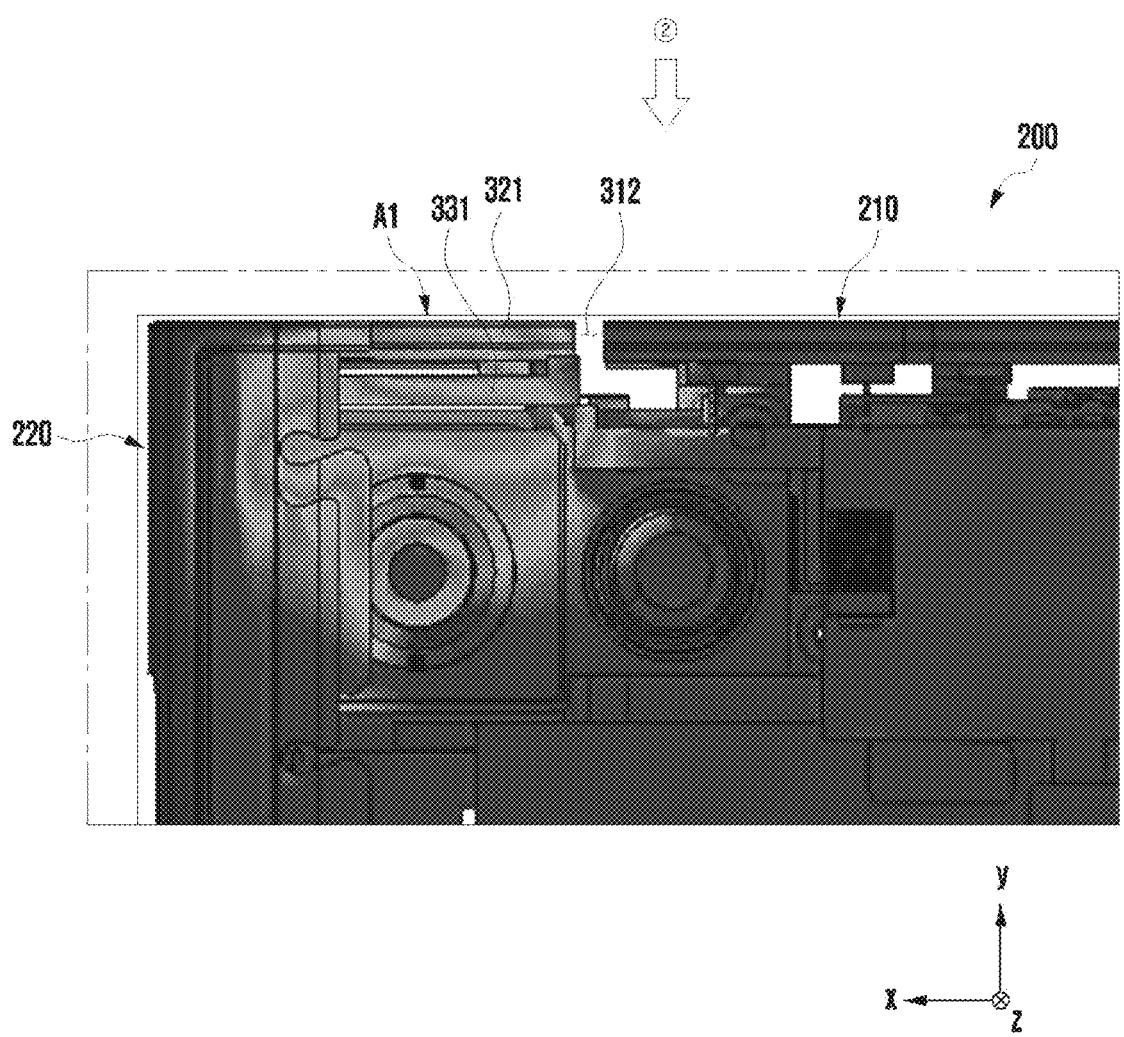
FIG. 7B is a view illustrating the current distribution of an antenna with respect to area 7b of FIG. 6A according to an embodiment of the disclosure.
Figure 7C:
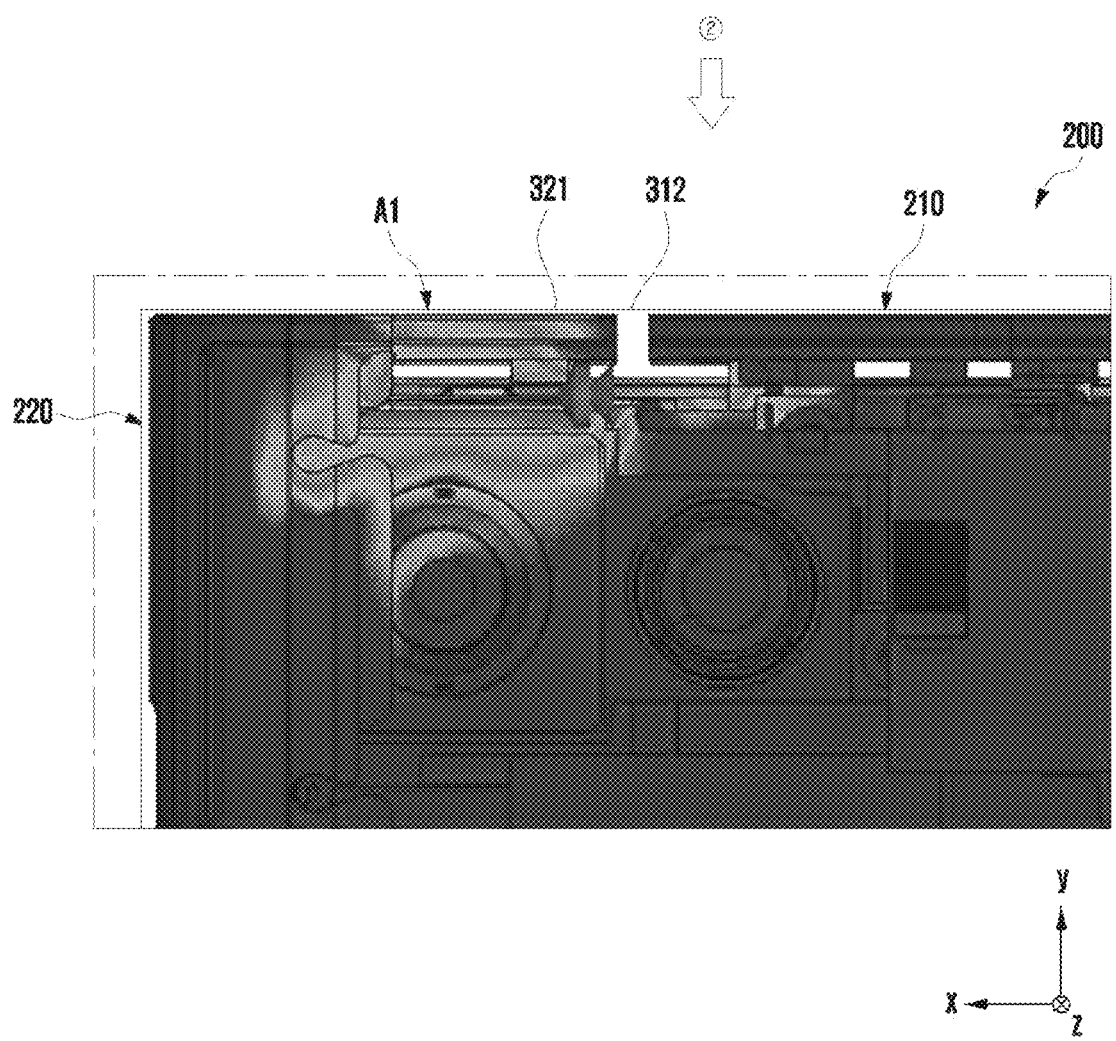
FIG. 7C is a view of a comparative example illustrating the current distribution of an antenna, in a slide-in state according to an embodiment of the disclosure.

FIG. 7A is a view illustrating the current distribution of an antenna with respect to area 7a of FIG. 6D according to an embodiment of the disclosure. FIG. 7B is a view illustrating the current distribution of an antenna with respect to area 7b of FIG. 6A according to an embodiment of the disclosure. FIG. 7C is a view of a comparative example illustrating the current distribution of an antenna, in a case where the conductive stub 331 does not exist, in a slide-in state according to an embodiment of the disclosure.

Referring to FIGS. 7A to 7C, the current distribution (FIG. 7B) of a case where the first antenna (A1) configured to operate via the first conductive portion 321 is connected to be capable of capacitively coupled to the conductive stub 331 of the second housing 220 is slightly weaker than the current distribution (FIG. 7A) of the first antenna (A1) configured to operate via the first conductive portion 321 in a slide-out state, but the current distribution becomes stronger toward the second housing 220 than that of a comparative example (FIG. 7C) of a case where the conductive stub 331 does not exist. This may indicate that the conductive stub 331 may help reduce the degree of radiation performance degradation of the first antenna (A1) by compensating for the electrical length in a slide-in state.

Figure 8:
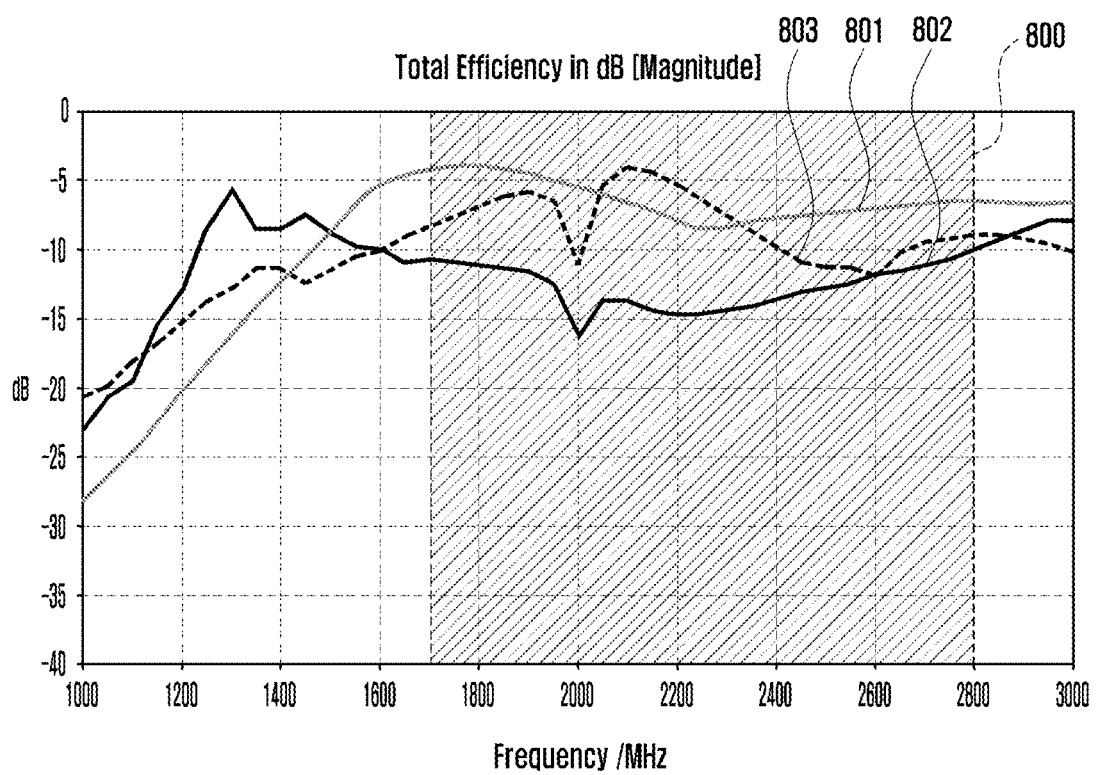
FIG. 8 is a graph comparing radiation performances of antennas, in a slide-in state according to an embodiment of the disclosure.

FIG. 8 is a graph comparing radiation performances of antennas, in a slide-in state according to an embodiment of the disclosure.

Referring to FIG. 8, the radiation efficiency (graph 803) of a case where the first antenna (A1) configured to operate via the first conductive portion 321 is connectable through capacitive coupling to the conductive stub 331 of the second housing 220 in a designated frequency band (area 800) (e.g., band ranging from about 1700 MHz to 2800 MHz) in a slide-in state is slightly lower than the radiation efficiency (graph 801) of the first antenna (A1) configured to operate via the first conductive portion 321 in a slide-out state, but is expressed relatively better than that of a comparative example (graph 802) of a case where the conductive stub 331 does not exist. This may indicate that the conductive stub 331 may help reduce the degree of radiation performance degradation of the first antenna (A1) by compensating for the electrical length in a slide-in state.

Figure 9A:
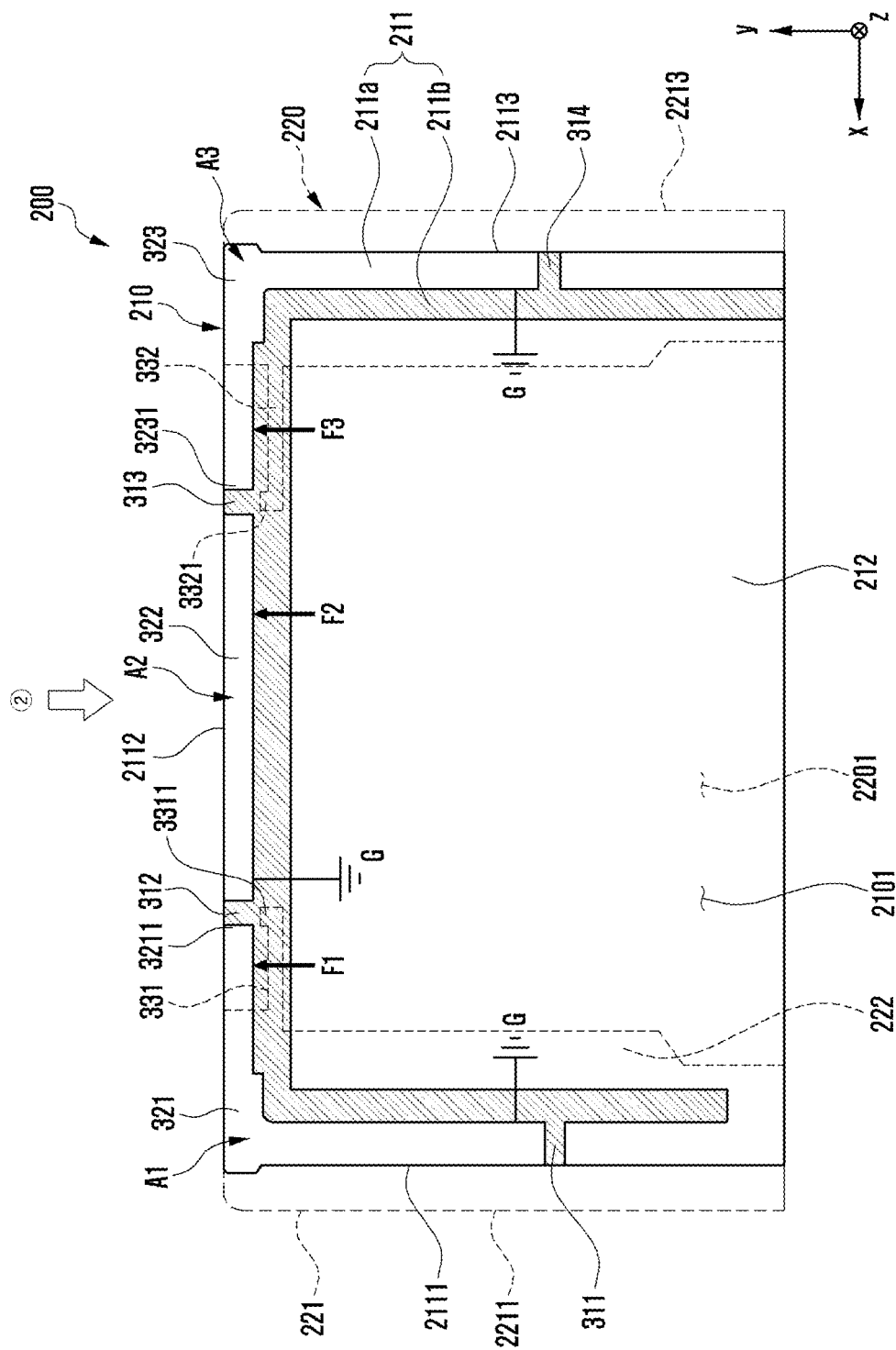
FIGS. 9A and 9B are configuration views depending on a slide-in/slide-out state of an electronic device including a plurality of conductive stubs, respectively, according to various embodiments of the disclosure.
Figure 9B:
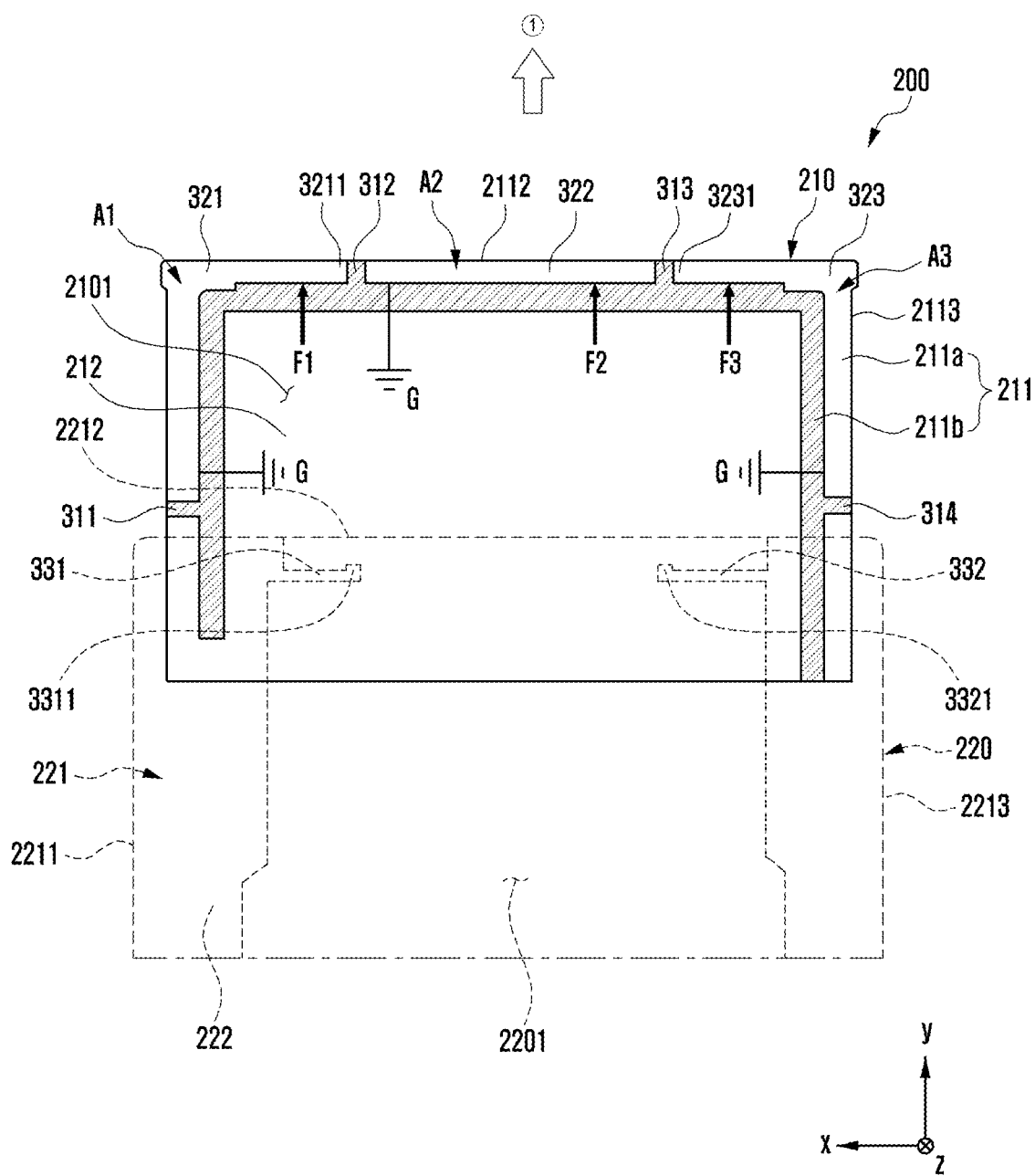

FIGS. 9A and 9B are configuration views depending on a slide-in/slide-out state of an electronic device including a plurality of conductive stubs, respectively, according to various embodiment of the disclosure.

In describing an electronic device of FIGS. 9A and 9B, the same reference numerals have been used for the components substantially the same as the components of the electronic device of FIGS. 6A to 6D, and the detailed descriptions may be omitted.

Referring to FIGS. 9A and 9B, an electronic device 200 may include a first housing 210 and a second housing 220 slidably coupled to the first housing 210. According to an embodiment, the electronic device 200 may be configured to allow the first housing 210 to be slid out (slide-out) in the first direction (direction ①) or be slid in (slide-in) in a second direction (direction ②) opposite to the first direction (direction ①) with reference to the second housing 220 gripped by a user.

According to various embodiments, the electronic device 200 may include a first antenna (A1) configured to operate via the first conductive portion 321, a second antenna (A2) configured to operate via the second conductive portion 322, and a third antenna (A3) configured to operate via the third conductive portion 323. According to an embodiment, in a slide-in state, a part of the first conductive portion 321(e.g., a part of the first side surface) and a part of the third conductive portion 323 (e.g., a part of the third side surface) may be concealed by a conductive member (e.g., the conductive member 221a of FIG. 6A) of the second housing 220, thereby reducing the radiation performance.

According to various embodiments, the electronic device 200 may include a first conductive stub 331 extending, to the second space 2201, from at least a part of the fourth side surface 2211 configured of the conductive member 221a of the second housing 220 and/or a second conductive stub 332 extending from at least a part of the sixth side surface 2213 to the second space 2201. According to an embodiment, in a slide-in state, the first conductive stub 331 may be disposed at a position where the first edge 3311, which is an end thereof, is capable of being capacitively coupled to the second edge 3211 which is an end (e.g., an end adjacent to the second segmentation portion 312) of the first conductive portion 321. According to an embodiment, in a slide-in state, the second conductive stub 332 may be disposed at a position where a third edge 3321, which is an end thereof, is capable of being capacitively coupled to a fourth edge 3231 which is an end (e.g., an end adjacent to the third segmentation portion 313) of the third conductive portion 323. Therefore, in substantially the same manner as described above, in a slide-in state, the first conductive stub 331 may help reduce the degree of radiation performance degradation by compensating for the electrical length of the first antenna (A1). In addition, in a slide-in state, the second conductive stub 332 may help reduce the degree of radiation performance degradation by compensating for the electrical length of the third antenna (A3).

In embodiments of the disclosure, the conductive stubs 331 and 332 arranged to be capable of capacitively coupled to the conductive portions 321 and 323 are formed through a partial area of the second housing, but is not limited thereto. For example, the conductive stubs 331 and 332 may be electromagnetically disconnected from the conductive portions 321 and 323 in a slide-out state, be electromagnetically coupled to the conductive portions 321 and 323 in a slide-in state, and be replaced with various elements (e.g., a substrate, conductive electronic components, or a separate metal bracket disposed in the second space) arranged in the second housing.

The conductive stubs 331 and 332 according to an embodiment of the disclosure are arranged to have bent edges 3311 and 3321, respectively, but are not limited thereto. For example, in a slide-in state, the conductive stubs 331 and 332 may have various shapes in which edges 3311 and 3321, which are ends thereof, are connectable to be capable of being capacitively coupled to the edges 3211 and 3231 of the respective conductive portions 321 and 323, for example, a tapered or inclined shape so that the conductive stubs 331 and 332 approach the conductive portions toward the edges 3211 and 3231 of the conductive portions 321 and 323 without a bent portion. As another example, the shapes of the conductive stubs 331 and 332 are shown similarly, but each shape of the conductive stubs 331 and 332 may be configured in various ways based on the shape of the electronic device or the frequency to be supported.

According to various embodiments, an electronic device (e.g., the electronic device 200 of FIG. 3A) may include a first housing (e.g., the first housing 210 of FIG. 3A) including a first space (e.g., the first space 2101 of FIG. 3A) and including a conductive portion (e.g., the first conductive portion 321 of FIG. 3A), a second housing (e.g., the second housing 220 of FIG. 3A) including a second space (e.g., the second space 2201 of FIG. 3A) and slidably coupled to the first housing, a flexible display (e.g., the flexible display 230 of FIG. 3A) disposed to be supported by the first housing and the second housing and having a display area expanding when being transitioned from a slide-in state to a slide-out state, and a wireless communication circuit (e.g., the wireless communication module 192 of FIG. 1) disposed in the first space and configured to transmit or receive a wireless signal in a designated frequency band via the conductive portion, and may include a conductive stub (e.g., the conductive stub 331 of FIG. 6A) disposed in the second housing and disposed to be connectable through capacitive coupling to at least a part of the conductive portion in the slide-in state.

According to various embodiments, the conductive stub may be disposed to be electromagnetically separated from the conductive portion in the slide-out state.

According to various embodiments, in the slide-in state, the conductive stubs may be arranged to be spaced apart from each other while being capable of making capacitive coupling to each other, along a second direction perpendicular to a first direction in which the first housing slides.

According to various embodiments, in the slide-in state, the conductive stubs may be arranged to be spaced apart to be capable of being capacitively coupled along the first direction in which the first housing slides.

According to various embodiments, in the slide-in state, the conductive stub may be disposed such that a first edge is capable of being capacitively coupled to a second edge of the conductive portion.

According to various embodiments, the conductive portion may be segmented by at least one segmentation portion, and the second edge may be positioned adjacent to the at least one segmentation portion.

According to various embodiments, the conductive stub may be electrically connected to a ground of the electronic device.

According to various embodiments, the second housing may be at least partially configured of a conductive member, and the conductive stub may extend from the conductive member.

According to various embodiments, the conductive stub may be integrally formed with the conductive member.

According to various embodiments, in the slide-in state, at least a part of the conductive portion may correspond to the conductive member and be received in the second space to be invisible from the outside.

According to various embodiments, the second housing may include an opening configured through the conductive member, and the conductive stub may extend to have a designated length from the conductive member to the opening.

According to various embodiments, the conductive portion may be supplied with power in an area overlapping the opening, when the second housing is viewed from the outside.

According to various embodiments, the opening may be filled with a non-conductive member.

According to various embodiments, the conductive stub may be disposed through a substrate, a conductive bracket, or a conductive electronic component arranged in the second space.

According to various embodiments, the designated frequency band may include a band ranging from 600 MHz to 9000 MHz.

According to various embodiments, an electronic device (e.g., the electronic device 200 of FIG. 3A) may include a first housing (e.g., the first housing 210 of FIG. 3A) including a first space (e.g., the first space 2101 of FIG. 3A) and including a first lateral member (e.g., the first lateral member 211 of FIG. 3A) having a conductive portion (e.g., the first conductive portion 321 of FIG. 3A), a second housing (e.g., the second housing 220 of FIG. 3A) slidably coupled to the first housing along a first direction (e.g., direction ① of FIG. 3A), including a second space (e.g., the second space 2201 of FIG. 3A) configured to receive at least a part of the first housing, and at least partially configured of a conductive member (e.g., the conductive member 221a of FIG. 6A), a flexible display (e.g., the flexible display 230 of FIG. 3A) disposed to be supported by the first housing and the second housing and having a display area changing when being transitioned from a slide-in state to a slide-out state, and a wireless communication circuit (e.g., the wireless communication module 192 of FIG. 1) disposed in the first space and configured to transmit or receive a wireless signal in a designated frequency band via the conductive portion, wherein at least a part of the conductive portion is received in the second space to be invisible from the outside so as to correspond to at least a part of the conductive member in the slide-in state, wherein the electronic device includes a conductive stub (e.g., the conductive stub 331 of FIG. 6A) extending from the conductive member and disposed to be connectable through capacitive coupling to at least a part of the conductive portion in the slide-in state.

According to various embodiments, the first lateral member may include a first side surface having a first length formed in a direction parallel to the first direction, a second side surface extending from the first side surface in a direction perpendicular to the first direction and having a second length shorter than the first length, and a third side surface extending from the second side surface in a direction parallel to the first side surface and having the first length, wherein in the slide-in state, the first side surface and the third side surface are received in the second space so as to be invisible from the outside, and the conductive portion is disposed through at least a part of the first side surface.

According to various embodiments, in the slide-out state, the conductive stub may be disposed to be electromagnetically separated from the conductive portion.

According to various embodiments, the second housing may include an opening configured through the conductive member, and the conductive stub may extend from the conductive member to the opening to have a designated length.

According to various embodiments, when the second housing is viewed from the outside, the conductive portion may be supplied with power in an area overlapping the opening.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing including a first space and a conductive portion;
   a second housing, including a second space, slidably coupled to the first housing;
   a flexible display, disposed to be supported by the first housing and the second housing, having a display area that expands when being transitioned from a slide-in state to a slide-out state;
   a wireless communication circuit, disposed in the first space, configured to transmit or receive a wireless signal in a designated frequency band via the conductive portion; and
   a conductive stub disposed in the second housing to, in the slide-in state, be connectable through capacitive coupling to at least a part of the conductive portion.

2. The electronic device of claim 1, wherein the conductive stub is disposed in the second housing to, in the slide-out state, be electromagnetically separated from the conductive portion.

3. The electronic device of claim 1, wherein in the slide-in state, the conductive stub is arranged to be spaced apart from the at least the part of the conductive portion to be capable of being capacitively coupled to the at least the part of the conductive portion along a second direction perpendicular to a first direction in which the first housing slides.

4. The electronic device of claim 1, wherein in the slide-in state, the conductive stub is arranged to be spaced apart from the at least the part of the conductive portion to be capable of being capacitively coupled to the at least the part of the conductive portion along a first direction in which the first housing slides.

5. The electronic device of claim 1, wherein in the slide-in state, the conductive stub is disposed such that a first edge is capable of being capacitively coupled to a second edge of the conductive portion.

6. The electronic device of claim 5,
   wherein the conductive portion is segmented by at least one segmentation portion, and
   wherein the second edge is positioned adjacent to the at least one segmentation portion.

7. The electronic device of claim 1, wherein the conductive stub is electrically connected to a ground of the electronic device.

8. The electronic device of claim 1,
   wherein the second housing is at least partially configured of a conductive member, and
   wherein the conductive stub extends from the conductive member.

9. The electronic device of claim 8, wherein the conductive stub is integrally formed with the conductive member.

10. The electronic device of claim 9, wherein in the slide-in state, at least a part of the conductive portion corresponds to the conductive member and is received in the second space to not be visible, from a perspective of viewing the electronic device from outside the electronic device.

11. The electronic device of claim 8,
wherein the second housing includes an opening configured through the conductive member, and
wherein the conductive stub extends to have a designated length from the conductive member to the opening.

12. The electronic device of claim 11, wherein the conductive portion is supplied with power in an area, which in the slide-in state, overlaps the opening, from a perspective of viewing the second housing from outside the second housing.

13. The electronic device of claim 11, wherein the opening is filled with a non-conductive member.

14. The electronic device of claim 1, wherein the conductive stub is one of a substrate, a conductive bracket, or a conductive electronic component arranged in the second space.

15. The electronic device of claim 1, wherein the designated frequency band includes a band ranging from 600 MHz to 9000 MHz.

16. An electronic device comprising:
a first housing including a first space and a conductive portion;
a second housing, slidably coupled to the first housing along a first direction, including a second space configured to receive at least a part of the first housing, the second housing at least partially configured of a conductive member;
a flexible display, disposed to be supported by the first housing and the second housing, having a display area that changes when being transitioned from a slide-in state to a slide-out state;
a wireless communication circuit, disposed in the first space, configured to transmit or receive a wireless signal in a designated frequency band via the conductive portion; and
a conductive stub, extending from the conductive member, disposed to, in the slide-in state, be connectable through capacitive coupling to at least a part of the conductive portion,
wherein in the slide-in state, at least a part of the conductive portion is received in the second space so as to correspond to at least a part of the conductive member, with the at least the part of the conductive portion that is received in the second space not being visible, from a perspective of viewing the electronic device from outside the electronic device.

17. The electronic device of claim 16, wherein the first housing includes:
a first side surface having a first length formed in a direction parallel to the first direction;
a second side surface, extending from the first side surface in a direction perpendicular to the first direction, having a second length shorter than the first length; and
a third side surface, extending from the second side surface in a direction parallel to the first side surface, having the first length,
wherein in the slide-in state, the first side surface and the third side surface are received in the second space so as to not be visible, from the perspective of viewing the electronic device from the outside of the electronic device, and
wherein at least a part of the first side surface includes the conductive portion.

18. The electronic device of claim 16, wherein in the slide-out state, the conductive stub is disposed to be electromagnetically separated from the conductive portion.

19. The electronic device of claim 16,
wherein the second housing includes an opening configured through the conductive member, and
wherein the conductive stub extends from the conductive member to the opening to have a designated length.

20. The electronic device of claim 19, wherein the conductive portion is supplied with power in an area, which in the slide-in state, overlaps the opening, from a perspective of viewing the second housing from outside the second housing.

* * * * *